United States Patent
Danisewicz

(12) 
(10) Patent No.: US 6,233,353 B1
(45) Date of Patent: May 15, 2001

(54) SYSTEM FOR SEGMENTING LINE DRAWINGS FROM TEXT WITHIN A BINARY DIGITAL IMAGE

(75) Inventor: Ronald G. Danisewicz, Methuen, MA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/106,321

(22) Filed: Jun. 29, 1998

(51) Int. Cl.[7] .................................................. G06K 9/34
(52) U.S. Cl. .................................................. 382/176
(58) Field of Search .................................. 382/176, 177, 382/178, 179, 180, 245, 246; 395/139, 155, 161, 157

(56) References Cited

U.S. PATENT DOCUMENTS

| | | |
|---|---|---|
| 5,191,438 * 3/1993 | Katsurada et al. | 358/426 |
| 5,202,933 4/1993 | Bloomberg | 382/9 |
| 5,335,290 * 8/1994 | Cullen et al. | 382/9 |
| 5,434,953 7/1995 | Bloomberg | 395/139 |
| 5,465,304 * 11/1995 | Cullen et al. | 382/176 |
| 5,592,574 1/1997 | Chilton et al. | 382/295 |
| 5,680,479 10/1997 | Wang et al. | 382/176 |

* cited by examiner

*Primary Examiner*—Andrew W. Johns
*Assistant Examiner*—Seyed H. Azaria
(74) *Attorney, Agent, or Firm*—R. Hutter

(57) ABSTRACT

A system that identifies and discriminates between image regions that consist of text lines of alphanumeric characters and image regions that largely consist of non-alphanumeric line-drawing components. Only image components which are determined to be alphanumeric characters are submitted to an OCR program, thus saving processing time and avoiding errors. The system mainly exploits the principle that text blocks in an image are characterized by regularly spaced horizontal runs of white consistent with inter-line spaces.

18 Claims, 41 Drawing Sheets

BLOCK 1

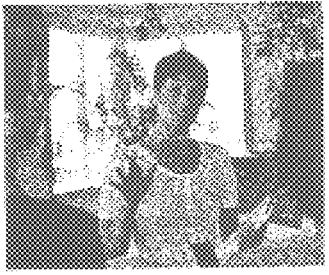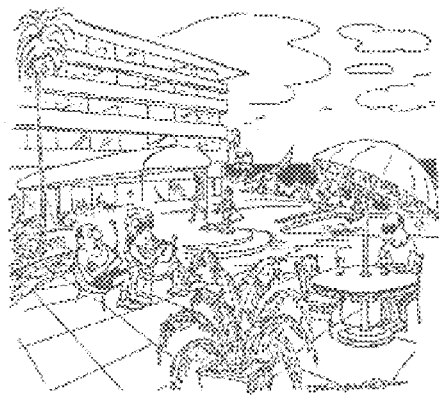
DOCUMENT IMAGE
*FIG. 1A*

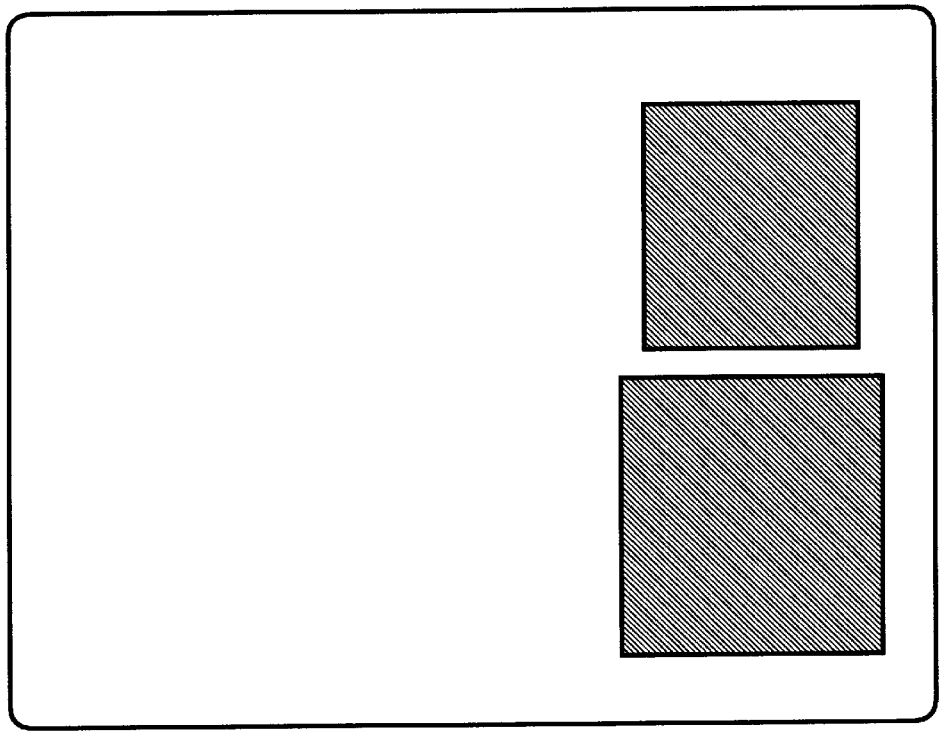
FIG. 1D LINE DRAWING REGIONS
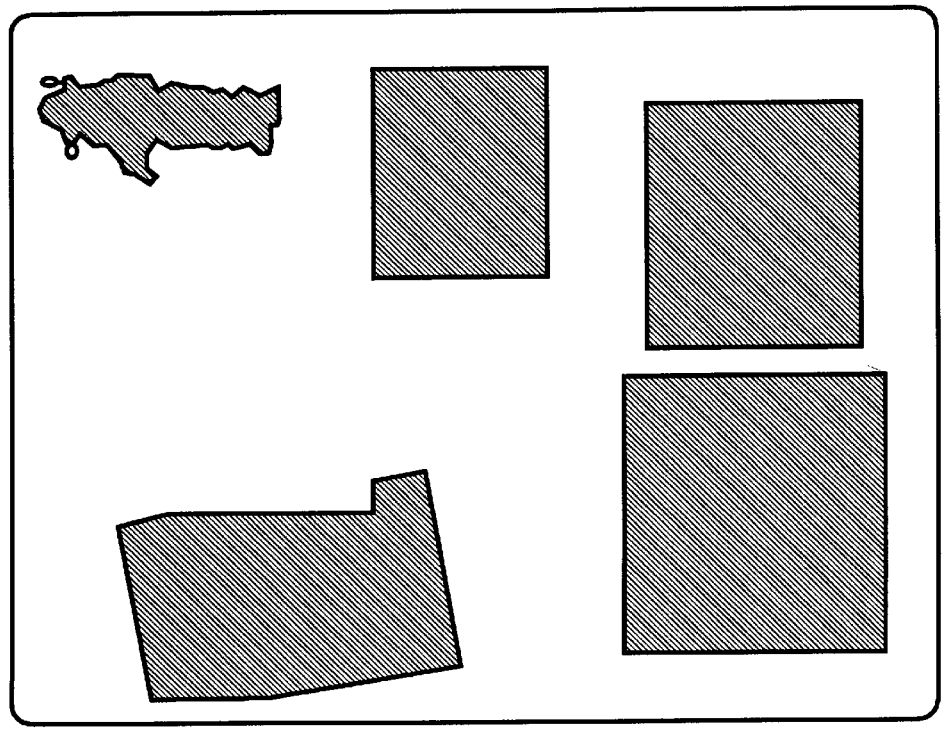
FIG. 1C GRAPHICAL REGIONS

LINE DRAWINGS WITH EMBEDDED TEXT

LINE DRAWING REGIONS EXTRACTED FROM IMAGE IN FIG. 2

INPUT TO DILATION

3x3 STRUCTURING ELEMENT

DILATE (5A,5B)

INPUT TO EROSION

ERODE (5D,5B)=CLOSE (5A,5B)

INPUT TO OPENING

OPEN (5F,5B)

EXAMPLE OF SEED_FILL
OPERATOR

EXAMPLE OF SEED_FILL
OPERATOR

EXAMPLE OF SEED_FILL
OPERATOR

EXAMPLE OF REDUCEXY ( ,1)

EXAMPLE OF REDUCEXY ( ,1)

EXAMPLE OF REDUCEX ( ,1)

EXAMPLE OF REDUCEX ( ,1)

EXAMPLE OF REDUCEY ( ,1)

EXAMPLE OF REDUCEY ( ,1)

EXAMPLE OF EXPANDXY

EXAMPLE OF EXPANDXY

EXAMPLE OF EXPANDX

EXAMPLE OF EXPANDX

EXAMPLE OF EXPANDY

EXAMPLE OF EXPANDY

TOP LEVEL BLOCK DIAGRAM OF SYSTEM

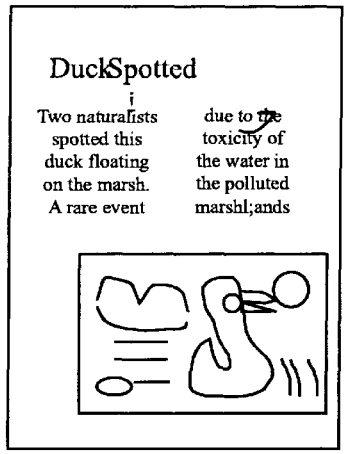 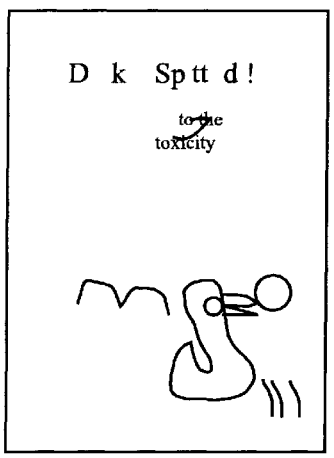 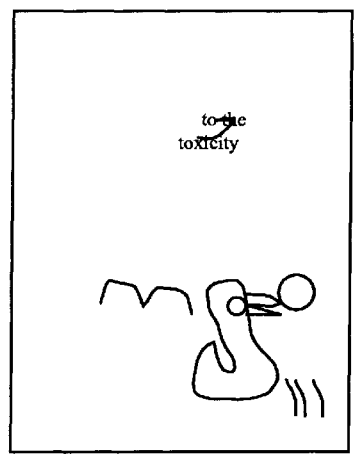
IM        LSC1        LSC2=LSC1-HL
FIG. 9B        FIG. 9C        FIG. 9D
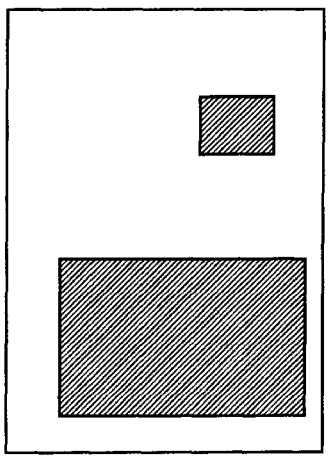 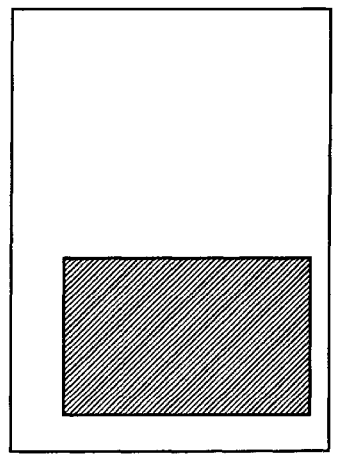
LSR        LR
FIG. 9E        FIG. 9F

The quick brown fox ju⊗mped ov er the lazy dog. The

For a given pair (W,H) if H=D, the pixel marked by ⊗ would be set only if L>=W.

*FIG. 11*

BLOCK 1

BLOCK 3

Make horizontal and vertical gutter maps.

A=COMPLEMENT (CLOSE ($IM_{RES(1\cdot1)}$, (XRES(1) /16, YRES (1) /8))
HGUTTER= OPEN (A, RECT (XRES (1),1))
VGUTTER=OPEN (A, RECT (1, YRES (1))

↓

Make body text map.

A=SUBTRACT ($IM_{RES(1\cdot1)}$, LSC).
B=CLOSE (A, RECT (XRES (1) / 4, YRES (1) / 4 ))
C=SUBTRACT (B, VGUTTER)
D=OPEN (C, (XRES (1), YRES (1))
E=SEED_FILL (C,D)
BODY_TEXT=CLOSE (E, RECT (XRES (1), 1)

↓

Make stray text map.

STRAY_TEXT=CLOSE (SUBTRACT (A, BODY_TEXT), RECT(XRES (1) / 4,1)

↓

Make line drawing suspect region map.

LCS=SUBTRACT (LCS, BODY_TEXT)
LSR=CLOSE (LCS, RECT (XRES (1), YRES (1)))
LSR= SUBTRACT (LSR,HGUTTERS)
LSR= SUBTRACT (LSR, VGUTTERS)
LSR= SUBTRACT (LSR, BODY_TEXT)
LSR= UNION (LSR, SEED_FILL (STRAY_TEXT, LSR)

BLOCK 4.1

BLOCK 4.2

SYSTEM FOR SEGMENTING LINE DRAWINGS FROM TEXT WITHIN A BINARY DIGITAL IMAGE

FIELD OF THE INVENTION

The present invention relates to optical character recognition (OCR) systems, and in particular relates to a method for distinguishing, in an image being analyzed, regions containing lines of alphanumeric text characters from regions containing line drawings.

BACKGROUND OF THE INVENTION

A document recognition system is a system that takes as input a digitized image of a document and outputs a text-based digital representation of the document. The output representation captures, at least, the text in the document as recognized by the system, but may also capture the graphics and layout of that document as recognized by the system. The output produced is in a format suitable as input to some target text processing application. That target application may, for example, be a word processor, text editor, or a spreadsheet program.

A hypothetical document recognition system might typically be logically and structurally decomposed into four subsystems, a segmentation subsystem, a character recognition subsystem, a format/layout analysis subsystem, and an output subsystem.

The segmentation subsystem is usually at the front end of the system and serves to segment the image into distinct text regions and graphics regions. This invention would be integrated as part of this subsystem. This invention extends the capability of the segmentation subsystem to segregate line drawing regions from text regions.

The character recognition subsystem analyzes the imaged text rendered in a particular region of the image with the purpose to produce as output the underlying text corresponding to that imaged text. It converts the image of text to character codes for that text. The character recognition subsystem should be restricted to processing purely text regions. The character recognition subsystem should not process any of the graphical (non-text regions) in the document, it should ignore such regions. If the character recognition system were to encounter a graphics region, it would assume that the region is text and may generate spurious characters. Also, the character recognition subsystem may waste CPU time trying to nonsensically interpret graphical elements in such a region as text. By improving the ability of the segmentation subsystem to efficiently distinguish graphics regions from text regions, this invention reduces the processing load of the character recognition subsystem. It also has the potential to increase the accuracy of the output of this subsystem by eliminating the generation of any spurious characters resulting from processing a graphics region.

The format/layout analysis subsystem analyzes the output of both the segmentation and character recognition subsystems in an attempt to capture the format and layout of the document in a representation internal to the system. The layout analysis subsystem may need information on the position and location of all graphical regions so to properly construct a representation of the document. For example, such knowledge is critical in determining which text regions are captions (which would be treated specially because they do not form part of the main text flow of the document).

The document output subsystem converts this internal representation to produce an output that is suitable for a particular target document processing application. It may be desirable to "cut" graphics regions out of the document image so that they can be "pasted" as image into the text document representation that is output by the document recognition system if the output representation accommodates this. Since this invention extends the class of regions that are accurately classified as having dominantly graphical content, the invention will enhance this aspect of the output subsystem.

A document recognition system may retain graphics regions as digital image throughout the system. These regions can be embedded as image in the output that the target application receives or can be entirely dropped from the output representation.

The graphical regions of the image may be broadly classified into two types, those that are representations of continuous-tone images, such as photographs, and those that are not intrinsically continuous tone in origin, such as cartoons, drawings, maps, flowcharts, and diagrams. This disclosure refers to the graphic elements that are not continuous tone in nature as line drawings.

In this disclosure it is assumed that the image being processed is binary, meaning it has a depth of 2 and pixels can only take on values from the set $\{0,1\}$ representing white and black respectively. In a binary image, continuous tone regions from a grayscale image may be rendered as halftones where the ratio of white to black pixels in a small area reflects the gray level in the grayscale rendering over that area. This technique is called dithering. Line drawings and text are intrinsically not continuous in tone, such regions from the image are ideally rendered from a grayscale image by thresholding.

DESCRIPTION OF THE PRIOR ART

In the prior art, U.S. Pat. No. 5,202,933 discloses a system for segmenting text regions from graphic regions in an image. The method provides for the use of morphological operations, preferably at a reduced scale, to eliminate vertical rules and lines from an image and then the illumination of horizontal rules and lines. The remaining portion of the image data is considered a text region. The overall morphology exploited in this patent exploits the notion that text images are generally packed tightly and that line drawings have sparse pixel distributions with thin strokes.

U.S. Pat. No. 5,335,290 discloses another system for segmenting text regions, picture regions and line drawings in a document image. Run lengths of on-pixels for each scanline from the image are used to find characteristics of text. This is a "bottom up" method of identifying text regions, in that all of the data in a particular image is tested to be text, and those portions of data which are not determined to be text are then classified as picture or line drawings.

U.S. Pat. No. 5,434,953 discloses another system for distinguishing text from line drawings in an image. First, a low-resolution consideration of the image, such as 16 pixel× 16 pixel tiles, are used for sub-sampling of the various regions in the image.

U.S. Pat. No. 5,592,574 discloses a method of processing an original image, in particular an image including text, which permits manipulation of the image, such as changing its aspect ratio, while adjusting only white space between lines of text, so that the text itself is not distorted.

U.S. Pat. No. 5,680,479 discloses another system for distinguishing text regions from non-text regions in an image. Connected components are identified in the pixel image data and the text/non-text determination is made based on the size of the connected components and whether the text units are connectable to horizontally-adjacent connected components which may be other characters.

SUMMARY OF THE INVENTION

According to one aspect of the present invention, there is provided a method of analyzing data forming a two-dimensional image, comprising the step of identifying a subset of black pixels in the data as likely to belong to a line drawing region if there is not a predetermined arrangement of horizontal runs of white pixels above and below the subset of black pixels.

According to another aspect of the present invention, this step of identifying pixels as likely to belong to a line drawing region includes identifying the subset of data as likely to belong to a line drawing region if W/H is not within a predetermined range, wherein the data is characterized by a first run of white pixels overlapping a second run of white pixels by a minimum length W, the first run of white pixels being spaced from the second run of white pixels by a vertical separation H.

According to another aspect of the present invention, there is provided a method of analyzing full-resolution data forming a two-dimensional image. Low-resolution data is derived from the full-resolution data, the low-resolution data being consistent with a low-resolution version of the two-dimensional image. For a subset of the low-resolution data characterized by a first run of white pixels overlapping a second run of white pixels by a minimum length W, the first run of white pixels being spaced from the second run of white pixels by a vertical spacing H, the subset of data is identified as likely to belong to a line drawing region if W/H is not within a predetermined range. A set of black pixels which are connected to data in the image which is identified as likely to belong to a line drawing region is identified with line art components which are connected to the black pixels.

BRIEF DESCRIPTION OF THE DRAWINGS

FIG. 1A is a sample of a document image having different types of image data therein;

FIGS. 1C and 1D show blocked-out versions of the graphical and line drawing regions of the original image of FIG. 1A;

FIGS. 9B–9F show example portions of an image being processed according to various blocks such as shown in FIG. 9A;

FIG. 11 shows a special case of the technique of the present invention whereby text regions are identified;

FIG. 14 is a flowchart showing another specific function according to a preferred embodiment of the present invention;

DETAILED DESCRIPTION OF THE INVENTION

Although this invention is capable of segregating both line drawings and halftones from text in a binary image, it is specifically designed to address the segmentation of line drawings from text. This is the more difficult distinction and is not as well addressed by prior art as is the simpler and less computationally costly task of segregating text regions from halftone regions which is a well solved problem. In simplistic terms, the line drawing regions have gross features that are closer to text than that of the halftone regions. Therefore it is generally more difficult to distinguish line drawings from text. In fact, text will often be embedded within a line drawing region.

Figure 1B:
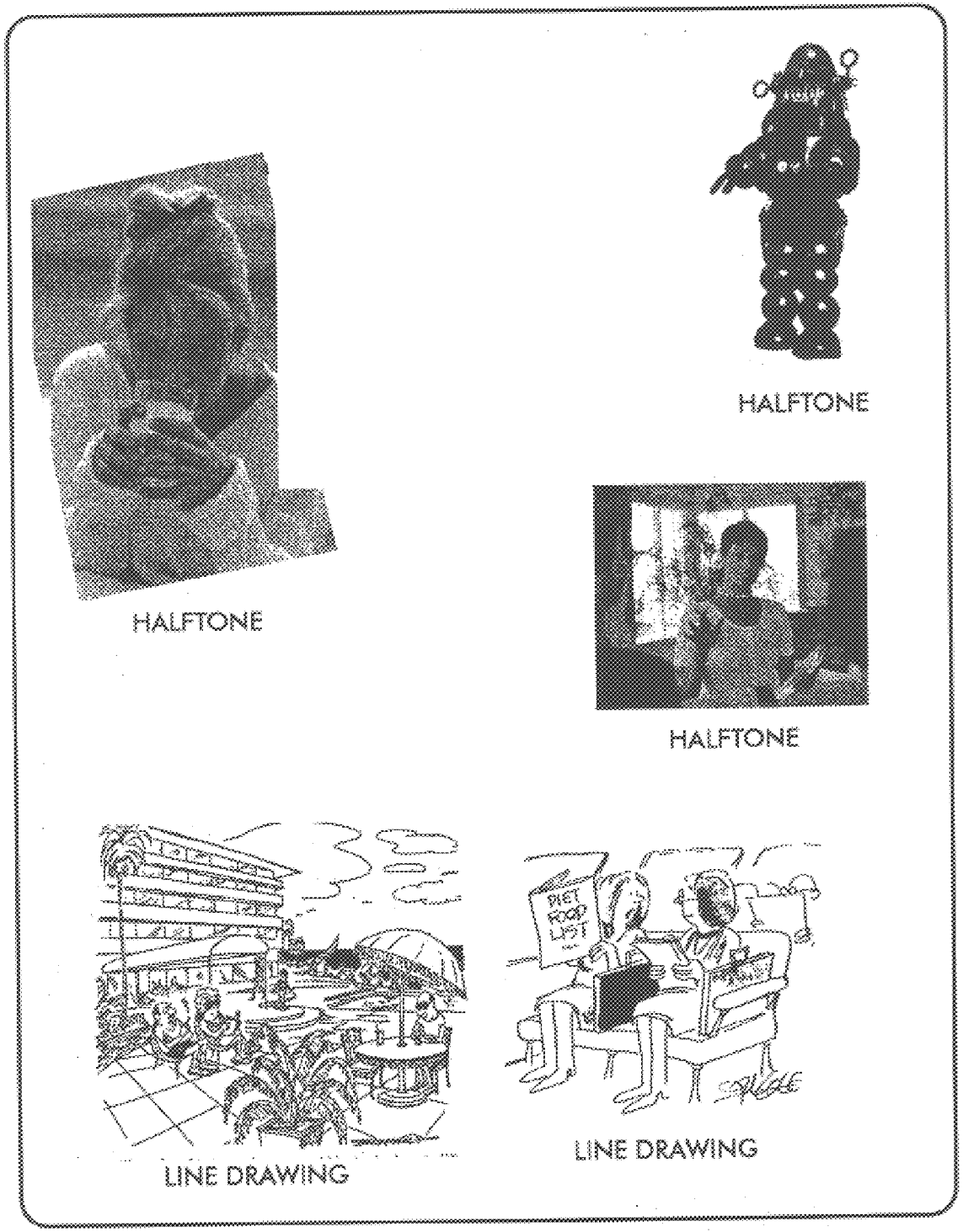
FIG. 1B is a derivation of image data from the original image of FIG. 1A, showing graphical components such as halftones and line drawings in isolation.

FIG. 1A depicts a document that contains both text and graphical regions. FIG. 1B depicts the contents of all the graphical regions, including halftones and line drawings. FIG. 1C depicts a map of the graphical regions. FIG. 1D depicts a map of those graphical regions that are line drawings. This disclosure uses the term region to refer to connected blobs (components) as in FIGS. 1C and 1D. There are 4 regions depicted in FIG. 1C and 2 regions depicted in FIG. 1D. In previous works, the maps of FIGS. 1C and 1D have been referred to a separation masks. The design of this invention is to produce a separation mask the like of FIG. 1D.

Figure 2:
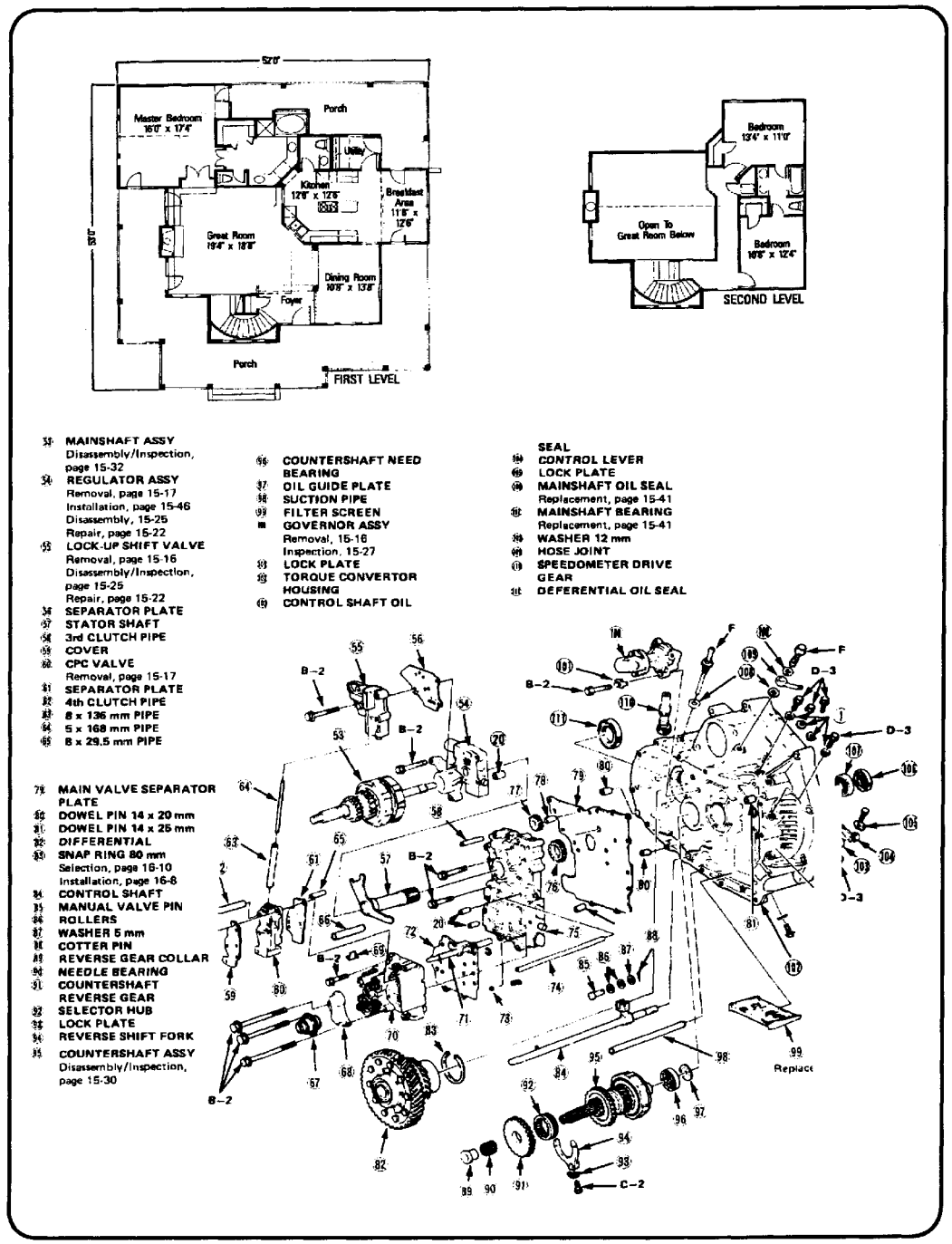
FIG. 2 is an example of an image of line drawings with embedded text.
Figure 3:
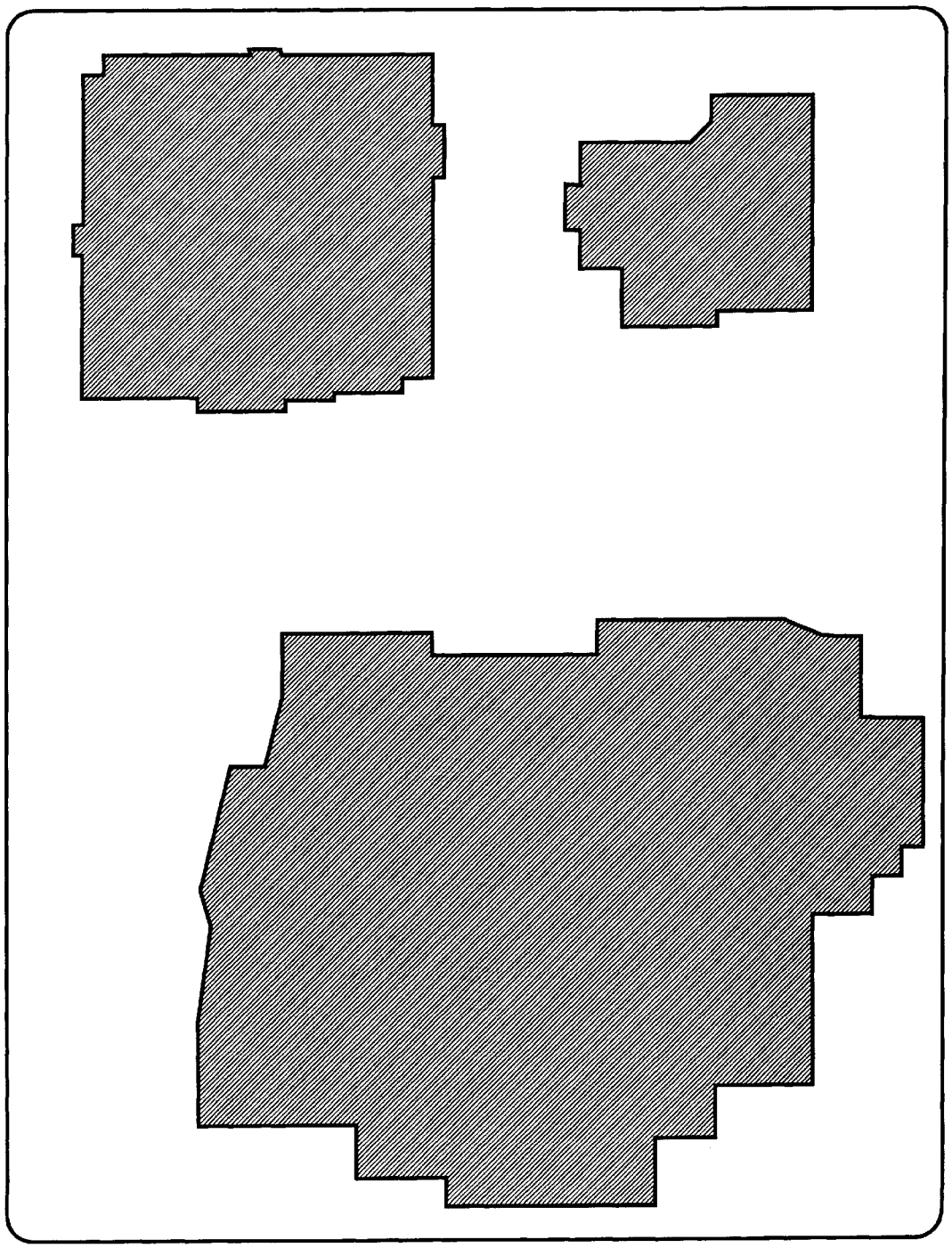
FIG. 3 is a demonstration of blocks of identified line drawing regions extracted from the image in FIG. 2.

Sometimes line drawings will have text embedded within them. An example of this would be a cartoon with callouts (balloons) for the text. In the context of this disclosure, such text is part of the line drawing region and is considered graphical. The 2 floor plans at the top of FIG. 2 and the engine diagram at the bottom of FIG. 2 are examples of such regions. FIG. 3 illustrates the segmentation of the document in FIG. 2. FIG. 3 depicts the prototypical output of this invention when given the input depicted by FIG. 2.

This disclosure will assume that the halftones have already been segmented by an earlier subsystem relying on prior art and that this segmentation information is available as input to the line drawing segmentation subsystem disclosed herein.

In the present invention, most of the computations are done at a significantly lower resolution than the input image resolution yielding a reduced computational load. Yet, accuracy is not sacrificed for speed. The invention utilizes a back-end verification step that offers extremely low probability of mislabeling text as line drawing, yet high probability of classifying all line drawing regions as such. This top down approach offers the advantage that burdensome computations are only done in a verification step applied to a subset of the entire image. The invention further utilizes the layout of the entire image to segment line drawing regions and uses the context of body text to eliminate misclassifications of text as line drawing. The invention does not require any information from character recognition subsystem, therefore can be implemented independently of and before the character recognition subsystem, thus identifying line drawing regions before character recognition. This saves the character recognition the computational load of processing the line drawing regions.

TERMINOLOGY, NOTATION, AND BASIC OPERATORS

For conciseness, this disclosure will repeatedly refer to various terms and operations. Most of them are generally used in the field of image processing, but some may have very specific denotations used herein. Those terms and operations are precisely defined up front in this section. This section also explains the notation that the disclosure uses.

FLOOR(x) is defined to be the greatest integer i such that i<=x.

NOTATION FOR IMAGES

This disclosure will represent a digital image by a matrix of picture elements (pixels). In a grayscale image, these pixels take on values in some range, one extreme of the range representing white. The other extreme of the range representing black. The number of levels in this range is called the depth. This is the same as the distinct number of values a given pixel can take on. The levels encode the intensity of a given pixel. The highest intensity being white, the lowest being black, intermediate levels representing varying levels of gray.

This disclosure is applicable to a binary input image, binary meaning it has a depth of 2 and pixels can only take on values from the set {0,1}, 0 signifying white, 1 signifying black.

The binary image that is input to this invention may be derived from thresholding a grayscale image. This simply means that a threshold, T, is selected. If a pixel's value, I(x,y) is less than or equal to T, it is assigned black (1). If the value is greater than T, it is assigned white (0). So each pixel in a binary image can be represented by one bit.

Sometimes, rather than being thresholded, the continuous tone graphical regions of the image are halftoned. This means that the average gray level over a small neighborhood of the image is represented by the ratio in the number of white pixels to black pixels distributed in that neighborhood. Whether a continuous tone region of the underlying grayscale image is thresholded or halftoned to binary, this disclosure will refer to the binary versions of such regions as halftones, to be distinguished from all other graphical regions, for which the term line drawing applies.

This disclosure will also use the term "map" interchangeably with the term "image" to denote a rectangular matrix of values. This usage carries only a subtle semantic distinction between the two terms. Whereas the pixels in the input image are interpreted as intensity levels (in the binary case, these correspond to labels for white and black), the pixels in maps derived from the original image can be thought of as labels in the more general sense. As a pixel with value 1 may signify a black pixel in a map of the original image, a pixel with the value 1 may signify a pixel that is labeled as line drawing in the output map produced by this invention.

This disclosure will refer to a specific map by a name consisting of all upper case characters. A single letter will signify that that map is just an intermediate, local, temporary result and the disclosure may use that name in a completely different context later in the document. When the name of a map is longer than 1 character, that map is unique, has special significance, and the disclosure may refer back to it. For example, A, B, C, D, and E will be used repeatedly throughout to signify generic maps that are used to store intermediate, temporary results, whereas the map IM will always refer to the full resolution input image.

Figures 4A, 4B, 4C:
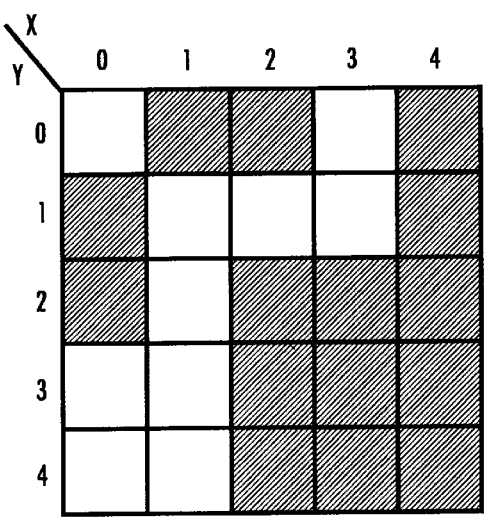
FIGS. 4A–4C are a demonstration of a pixel-relationship convention used in the present description.

Whenever this disclosure refers to a specific pixel in a map, it will use an (x,y) pair or a lower case letter. This can be thought of as being a unique address, or reference for a particular pixel location in the map. The value of a particular pixel in a map A will be denoted by A(x,y) when the pixel is addressed by its (x,y) pair or a A(a), where a lower case letter, in this case a, is used to symbolically address the pixel at coordinate (x,y). The top left of the image corresponds the coordinate pair (0,0). The x coordinate increases moving to the right of the image, the y coordinate increases moving down the image. This is depicted in FIGS. 4A, 4B and 4C.

All maps in this disclosure will have some region of support given by horizontal and vertical dimensions, say N×M, meaning I(x,y)=0 for 0>x>(N−1) or 0>y>(M−1). For example, the maps in FIG. 4 have support of 5×5. Unless explicitly stated, all pixels outside the dimensions of a given image can be considered 0 for the purpose of computation. When operating on an image of dimension N×M, it may be necessary to conceptually extend the input image to be of arbitrarily large dimensions with pixels set to 0 outside the N×M region of support, however the result will only be defined within the N×M region of support.

This disclosure will refer to a pixel that is set to some desired value as an on-pixel and a pixel that does not have the desired value as an off-pixel. Unless otherwise stated, an on-pixel will take on a value of 1 and an off-pixel will take on a value of 0. For example, the map of FIG. 4 has pixels in the set {b, c, e, f, j, k, m, n, o, r, s, t, w, x, y} as on-pixels and pixels in the set {a, d, g, h, i, l, p, q, U, v} as off pixels.

This disclosure will make use of formulations where a binary image (map) is interpreted as the set of all the on-pixels in the map. In this context an on-pixel will be identified by its (x,y) pair or, symbolically, by a lower-case letter. When this disclosure states that a map or image contains certain pixels, this will imply this set context and will mean the same thing as stating, in matrix context, that only those pixels are on-pixels, the complement (remaining) pixels are off-pixels. Also, stating that a pixel is "set" is equivalent to stating that it is an on-pixel or, in set context, that the image contains that pixel. Setting a pixel at a coordinate pair (x,y) will mean making it an on-pixel, which, using the set context, is equivalent to adding that coordinate pair to the set of pixels contained by an image. In set context, the image in FIG. 4 contains only pixels {b, c, e, f, j, k, m, n, o, r, s, t, w, x, y}.

Connected Components

This disclosure will make extensive use of the concept of an 8-connected component as defined in the following statements.

In the arrangement in FIG. 4A, pixel s is an 8-neighbor only to pixels m, n, o, r, s, t, w, x, and y. These are all the pixels that immediately surround s.

If pixel x is an 8 neighbor of pixel z, then pixel z is an 8 neighbor of pixel x.

A link is an ordered pair of pixels that are 8-neighbors of each other.

A path from any pixel x to any pixel z is a list of links where the first pixel of the first link is pixel x, where the first pixel of the kth pair for any pair other than the first pair is the 2nd pixel in the (k−1)th (previous) pair, and where z is the 2nd pixel in the last pair. For example, in FIG. 4B, (a,g),(g,h),(h,m),(m,s) defines a path from a to s.

Pixel x is 8-connected to pixel z if and only if there is at least one path from pixel x to pixel z that has links where the pixels in the links are all on-pixels. Henceforth the disclosure will use the term connected to mean the same thing as eight connected. In FIG. 4B, pixel e is connected to pixel w, since a path can be specified from e to w where all the links in the path have on-pixels. One such path is (e,j), (j,n), (n,r), (r,w). Another is (e,j), (j,o), (o,t), (t,y), (y,x), (x,w).

A connected component is defined through transitive closure under connectivity. This means the following. Through transitivity, if pixel x is connected to pixel y, and pixel y is connected to pixel z, then pixel x is connected to pixel z. If x is a pixel in a connected component, the connected component in which x resides is the set of all pixels connected to x.

In FIG. 4A, the set of pixels:

{e,j,m,n,o,r,s,t,w,x,y} form one connected component. The set of pixels:

{b,c,f,k} form yet another connected component.

Image Operators

Again, given the set context for an image, where an image is interpreted as the set of all on-pixels in the image, it is possible to define the following set operators.

The union of A with B, denoted UNION(A,B), is the set of pixels that are on in either image A or image B. It is the union of the on-pixels from image A and image B. The union can be found pixel by pixel by computing the logical OR of A(x,y) with B(x,y) for all (x,y) pairs.

The intersection of A and B, denoted by ISECT(A,B), is the set of pixels that are on in both image A and image B. The intersection can be found pixel by pixel by computing the logical AND of A(x,y) with B(x,y) for all (x,y) pairs.

COMPLEMENT(A) is the set of all off-pixels in image A. A complement of a given image can be computed by assigning all the off-pixels in the input image to n-pixels in the output image and by assigning all the on-pixels in the input image to off-pixels in the output image. This is logical negation (or inversion) performed on each the value of each pixel location of the image.

SUBTRACT(A,B) is the set of all pixels in A which are in the complement of B. It can be defined in terms of ISECT and COMPLEMENT as ISECT(A,COMPLEMENT(B)).

This disclosure denotes translation of an image A by the coordinate pair (k,m) as TRANSLATE(A,k,m) and defines it as $$\text{TRANSLATE}(A,k,m) = \{(x,y) | (x,y) = (i+k, j+m), \forall (i,j) \in A\}$$

This states that the translation of an image by the coordinate pair (k,m) is computed by adding (k,m) to all the pairs that are elements of A. This translates (shifts) the image to the right by k pixels and down by m pixels. This means that if (i,j) is an on-pixel in the original image, it will be relocated to position (i+k,j+m) in the translated image.

This disclosure denotes the reflection of an image A as REFLECT(A) and defines it as $$\text{REFLECT}(A) = \{(x,y) | (x,y) = (-i,-j) \in A\}$$

This disclosure will make use of five image operators that take two images as their arguments (inputs) and which an image is the result (output). As a matter of semantics, the image used in the second argument will be referred to as the structuring element to distinguish it from the image that we are operating on.

This disclosure denotes the dilation of image A by image (structuring element) B as DILATION(A,B) and defines it as $$\text{DILATION}(A,B) = \{(x,y) | \text{ISECT}(\text{TRANSLATE}(B,x,y), A) \neq \emptyset\}$$

Figure 5A:
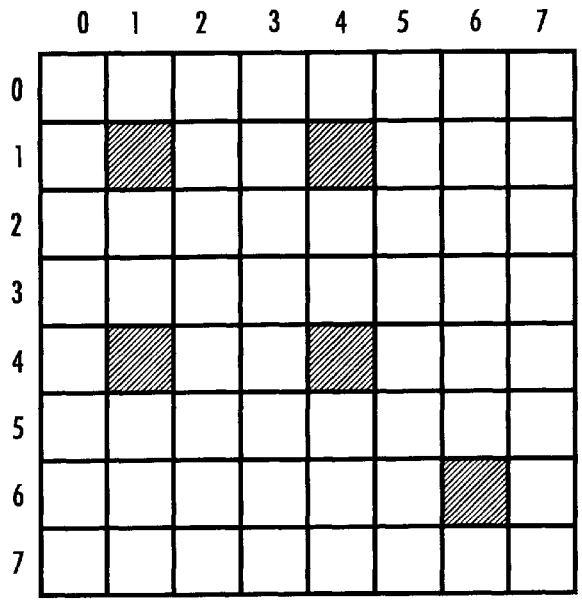
FIGS. 5A–5G represent a demonstration of different types of graphical manipulation techniques as used in the present invention.
Figure 5B:
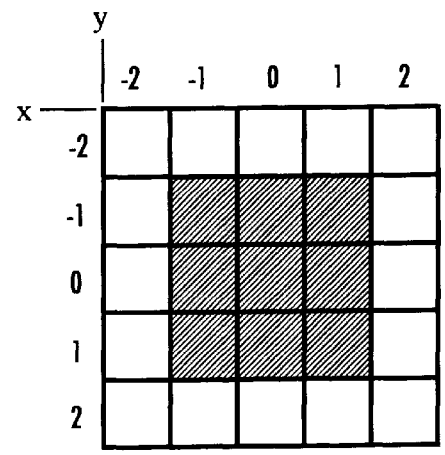
Figure 5C:
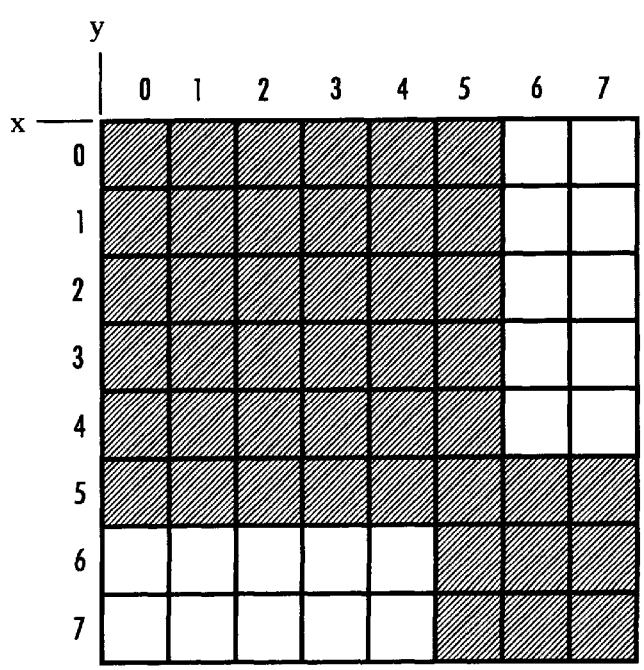

This states that the dilation of A by B is the set of coordinate pairs (locus of coordinates) that translate B so that the intersection of A with the translation of B is not empty ("not empty" means there is at least one on-pixel in the result of the intersection). These are all the pixel locations by which the structuring element B can be translated such that at least one on-pixel in the translated structuring element coincides with an on-pixel in the image A. FIG. 5C depicts the result of dilating the image depicted in FIG. 5A with the structuring element depicted in 5B.

This disclosure denotes the erosion of image A by structuring element B as EROSION(A,B) and defines it as $$\text{EROSION}(A,B) = \{(x,y) | \text{TRANSLATE}(B,x,y) \subset A\}$$

Figure 5D:
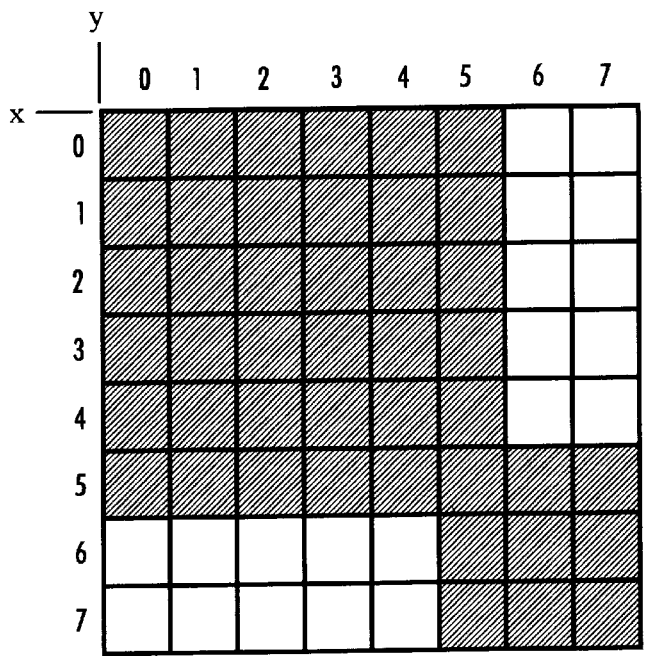
Figure 5E:
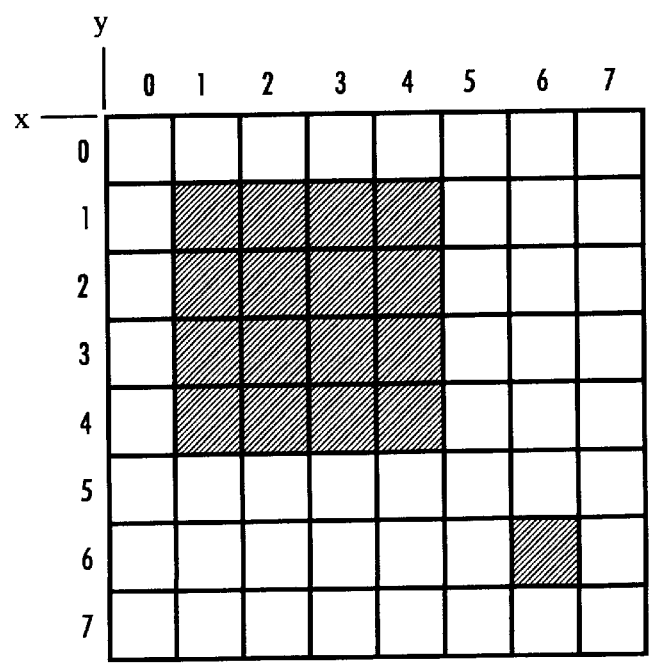

This states that the erosion of A by B is the set of coordinate pairs that translate B so that the result of the translation is a subset of A. In other words the locus of all the coordinates that translate structuring element B so that all the on-pixels in the translate coincide with on-pixels of the image A. FIG. 5E depicts the result of eroding the image depicted in FIG. 5D with the structuring element of 5B.

This disclosure denotes the opening of image A by image B as OPEN(A,B) and defines it as $$\text{OPEN}(A, B) = \left\{ \bigcup_{(x,y)} \text{TRANSLATE}(B, x, y) \;\middle|\; \text{TRANSLATE}(B, x, y) \subset A \right\}$$

Figure 5F:
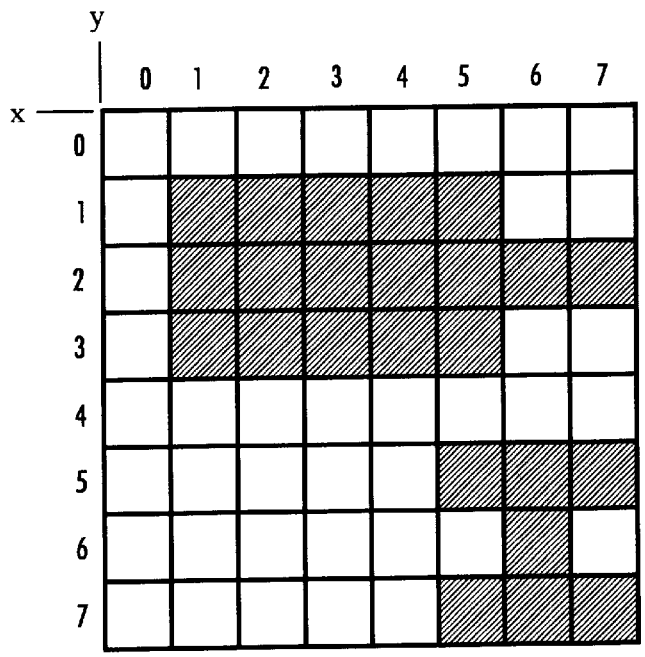
Figure 5G:
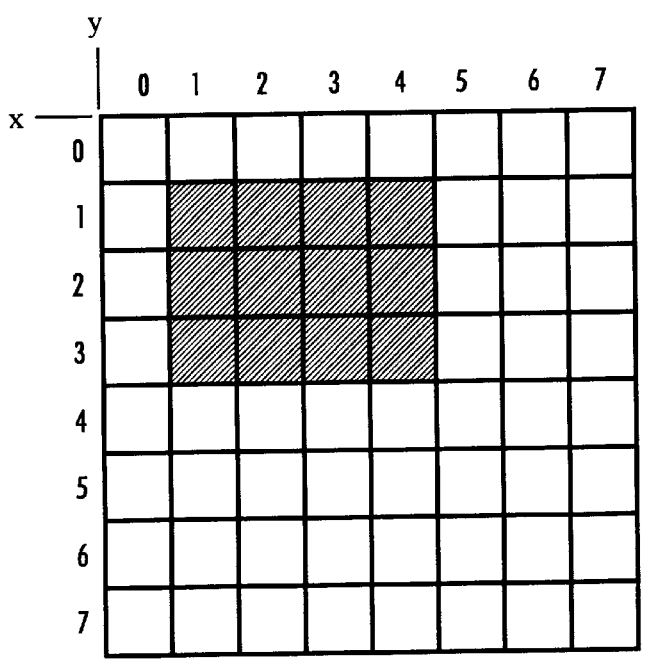

This states that the opening of A by B is the set of translations of B that are subsets of A. This can be expressed in terms of dilation and erosion. OPEN(A,B)=DILATE(ERODE(A,B),REFLECT(B)). Put another way, it is the set of all translations of B such that the on-pixels in the result of the translation coincide with all on-pixels in A. FIG. 5G depicts the result of opening the image of FIG. 5F with the structuring element of FIG. 5B.

This disclosure denotes the closing of an image A by an image B as CLOSE(A,B). It is defined as COMPLEMENT(OPEN(COMPLEMENT(A),B). That is opening the complement of A by B, then by taking the complement of the result. This is equivalent to ERODE(DILATE(A,B), REFLECT(B)). FIG. 5E depicts the result of closing the image of FIG. 5A with the structuring element of FIG. 5B, since FIG. 5D (which depicts the same map as FIG. 5C) is the result of dilating the map of FIG. 5A with the structuring element of FIG. 5B, and FIG. 5E depicts the result of eroding the map of FIG. 5D with the structuring element of FIG. 5B (reflecting the map of 5B yields the same map as in 5B since 5B is symmetric about (0,0)).

Assuming an on-pixel corresponds to black and a off-pixel pixel corresponds to white, openings are used to eliminate (whiten) black parts of the image where the structuring element cannot "fit" completely within the black, whereas closings are used to blacken parts of the image where the structuring element cannot completely fit within the white.

For example, an opening might be used to eliminate (whiten) certain black pieces in the image that are smaller than the structuring element. In FIGS. 5F and 5G the opening completely removes the connected component to the right in FIG. 5F and it removes the the narrow horizontal projection extending from the right side of the larger connected component to the left. Whereas a closing might be used to fill in gaps of white in the black which can be bridged by the structuring element. Also, a closing might be used to agglomerate (merge into a single connected component) separate black components that are spaced more closely than the dimensions of the structuring element. This latter use may be appropriate if a region is to correspond to a connected component in the resulting map. In FIGS. 5A and 5E, the closing happens to agglomerate the isolated pixels that are clustered to the left in the input map of FIG. 5A into a single connected component in the output map of FIG. 5E, yet the pixel that is isolated in the lower right of FIG. 5A remains isolated in 5E.

This disclosure will on occasion refer to a rectangular structuring element of dimension N×M. This corresponds to an image containing a rectangle of on-pixels of width N and height M where the rectangle has its center pixel at 0 (assume odd integer values for N and M). The image depicted by FIG. 5B is of this form where N=3 and M=3. Such a structuring element will be denoted by RECT(N,M). In the operations DILATE, ERODE, OPEN, and CLOSE this disclosure will often use the RECT(N,M) in the second argument. For example, CLOSE(I,RECT(7,11)) would denote closing I with a rectangular structuring element having width 7 and height 11. Note, all structuring elements in this disclosure will have pixels with negative coordinates to accommodate putting the center of the structuring element at (0,0).

Figure 6A:
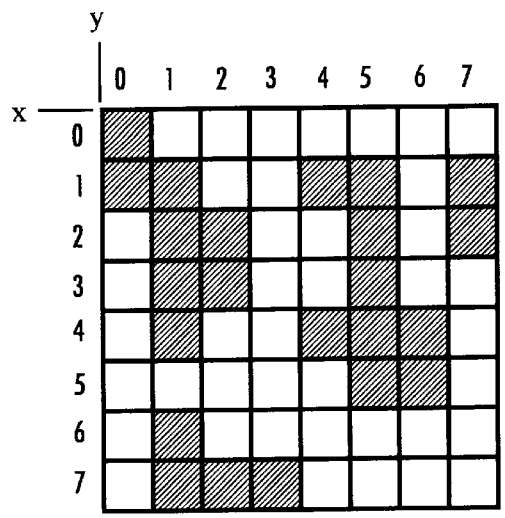
FIGS. 6A–6C represent a demonstration of another type of graphical manipulation used with the present invention.
Figure 6B:
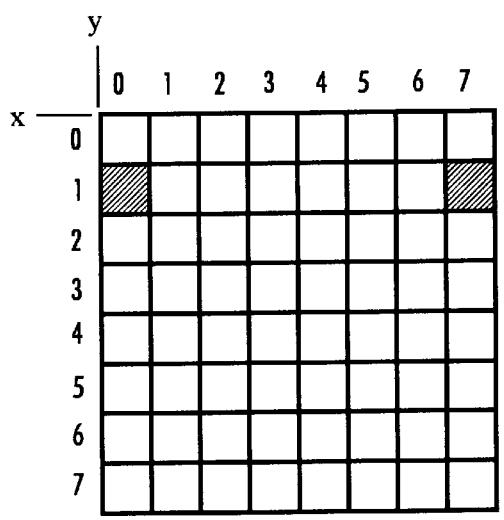
Figure 6C:
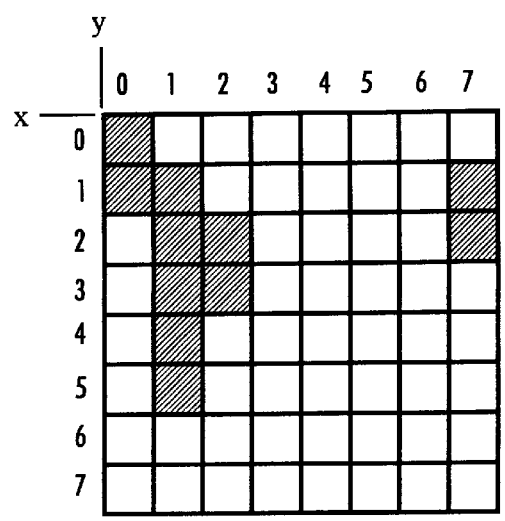

This disclosure denotes the seed fill of an image A by an image B as SEEDFILL(A,B). It is defined as the set of all connected components in image A that intersect with on-pixels in image B. Image B can be thought of as a set of marker pixels. This disclosure will refer to it as the seed. Only connected components in A so marked will show up in the resulting image. The result of the seed fill will be all the on-pixels in image A that are members of connected components in which at least one pixel in the connected component is marked by (coincides with) an on-pixel in B. FIG. 6C depicts the result of the seed fill of map FIG. 6A by the seed of FIG. 6B.

MULTIRESOLUTION ANALYSIS

The resolution of an image is expressed in terms of the number of pixels in a unit length in the x and y direction. This disclosure will always assume the unit is inches. XRES and YRES respectively denote the x resolution and the y resolution of the full resolution input image.

The invention will derive a number of lower resolution maps (images) from the full resolution image. These lower resolution maps are arrived at using steps that halve the x resolution, halve the y resolution, or halve both the x and the y resolution simultaneously. This disclosure will use the word "reduction" to denote as sequence of such steps, and the term "expansion" will denote a sequence of steps each of which doubles the resolution.

Figure 7A:
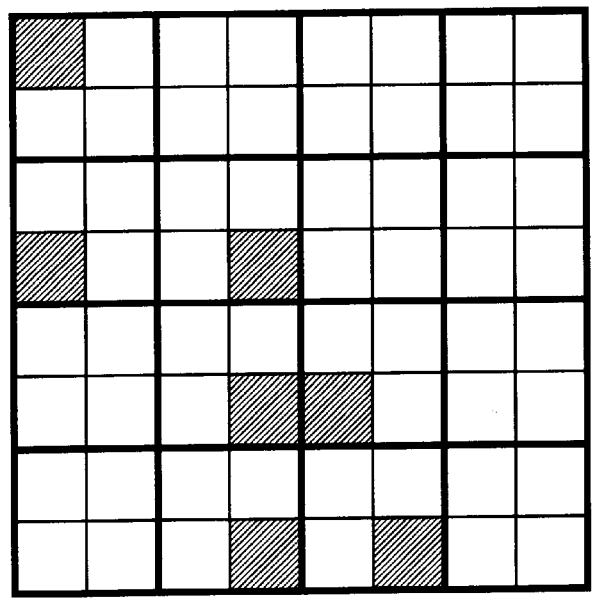
FIGS. 7A–7F represent a demonstration of another type of graphical manipulation used with the present invention.
Figure 7B:
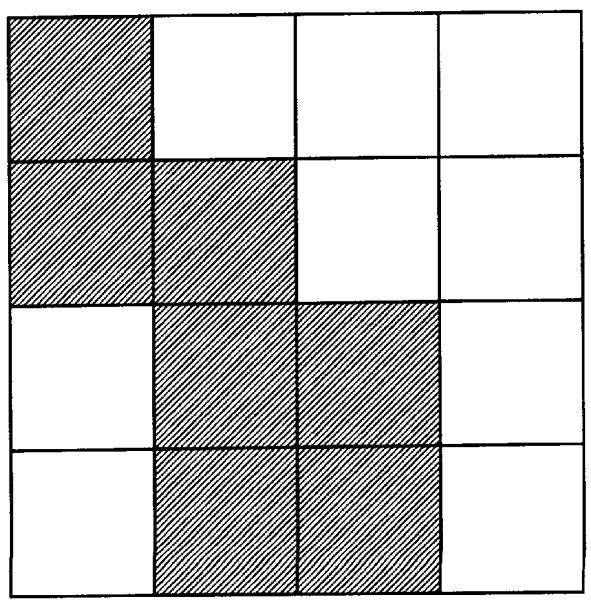

REDUCEXY(A,n) denotes an image operator where the input image is tiled into non overlapping 2×2 squares of pixels. n may take on the values 1,2,3,4. Each 2×2 tile in the input image with the upper left pixel at location (2x,2y) will be reduced to a single pixel in the output image at location (x,y). That output pixel will be set to one if n or more pixels in the 2×2 input tile have pixel values of 1, otherwise it will be set to 0. For conciseness, multiple reductions on the same image will be written as REDUCE(A,n,m,k). This translates to REDUCE(REDUCE(REDUCE(A,n),m),k). FIG. 7B depicts the result of REDUCEXY(A,1) applied to the image in FIG. 7A. The dimensions of the pixels in FIG. 7B have been drawn to correspond to the area in FIG. 7A to which they correspond. The bold lines in FIG. 7A demarcate pixels which are mapped to a single pixel in FIG. 7B.

Figure 7C:
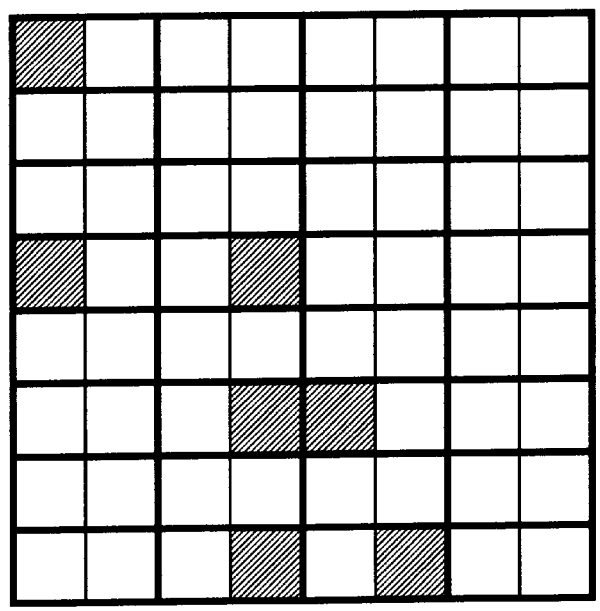
Figure 7D:
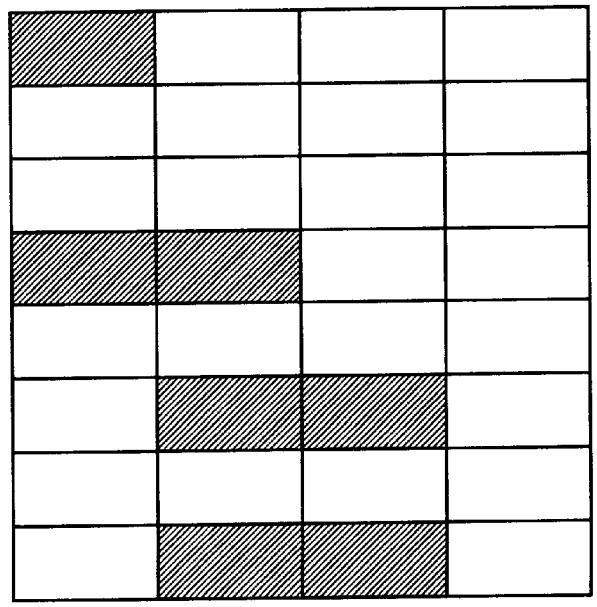

REDUCEX(A,n) denotes an image operator where the input image is tiled into non overlapping 2 pixel wide by 1 pixel high rectangles. n may take on the values 1 or 2. Each 2×1 tile in the input image with the left most pixel at (2x,y) will be reduced to a single pixel in the output image at location (x,y). That output pixel will be set to 1 if n or more pixels in the 2×1 input tile have pixel values of 1, otherwise it will be set to 0. FIG. 7D depicts the result of REDUCEX (A,1) applied to the image in FIG. 7C.

Figure 7E:
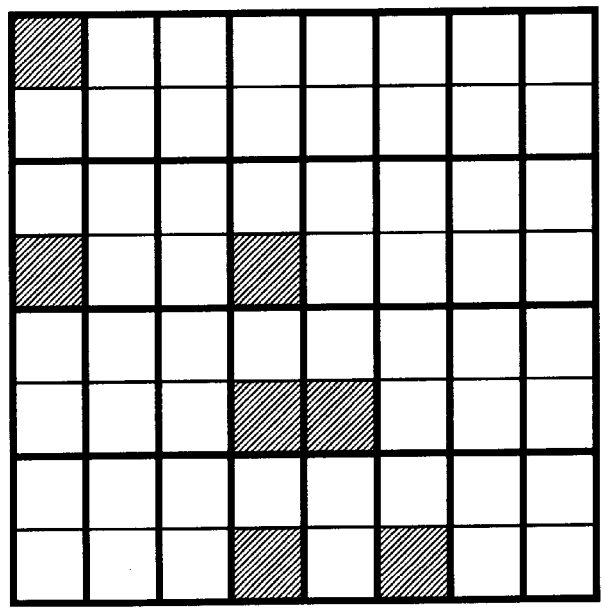
Figure 7F:
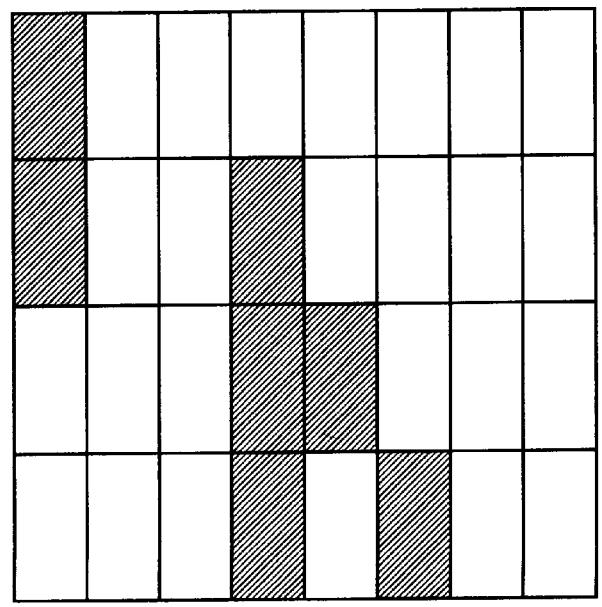

REDUCEY(A,n) denotes an image operator where the input image is tiled into 1 pixel wide by 2 pixel high rectangles. n may take on the values 1 or 2. Each 1×2 tile in the input image with the top most pixel at location (x,2y) will be reduced to a single pixel in the output image at location (x,y). That output pixel will be set to 1 if n or more pixels in the 1×2 input tile have pixel values of 1, otherwise it will se set to 0. FIG. 7F depicts the result of REDUCEY (A,1) applied to the image in FIG. 7E.

Each application of REDUCEXY reduces both the x and y resolution by a factor of 2. Each application of REDUCEX reduces the x resolution by a factor of 2. Each application of REDUCEY reduces the y resolution by a factor of 2.

Figure 8A:
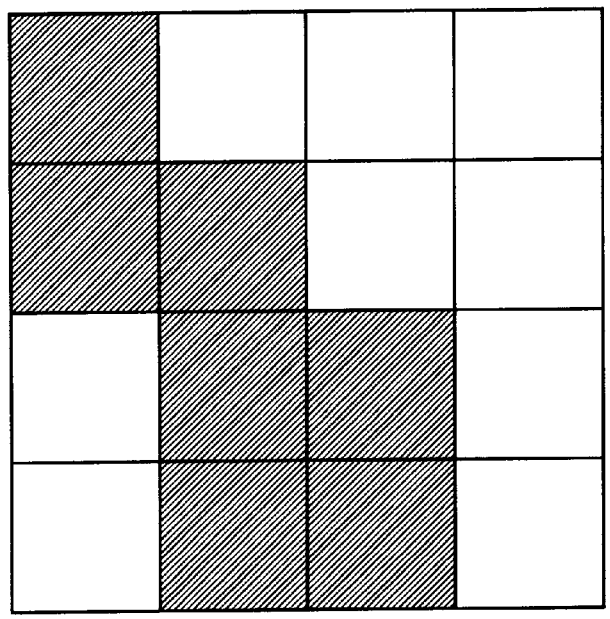
FIGS. 8A–8F represent a demonstration of another type of graphical manipulation used with the present invention.
Figure 8B:
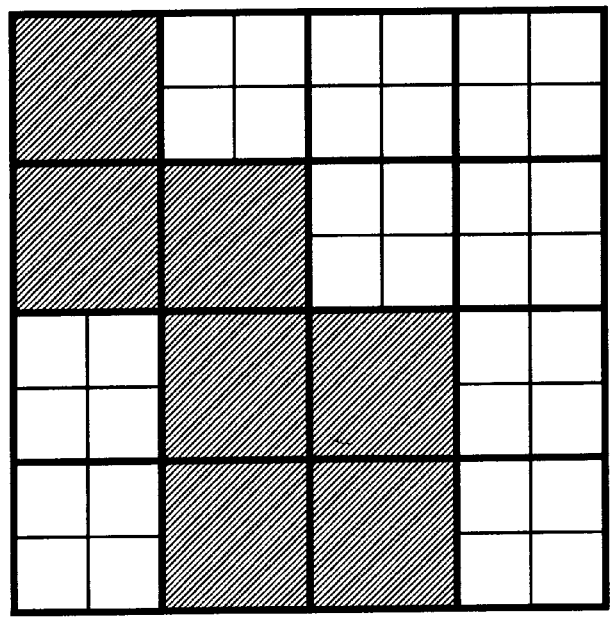

EXPANDXY(A) denotes an image operator where 1 pixel in the input image at location (x,y) becomes a 2×2 tile of pixels in the output image with the upper left pixel at location (2x,2y). The output pixels in a given tile all assume the same value as the corresponding input pixel. FIG. 8B depicts the result of EXPANDXY(A) applied to the image in FIG. 8A.

Figure 8C:
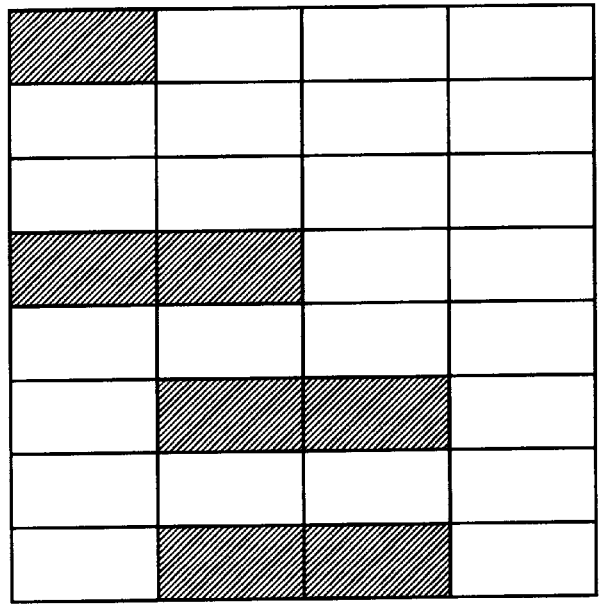
Figure 8D:
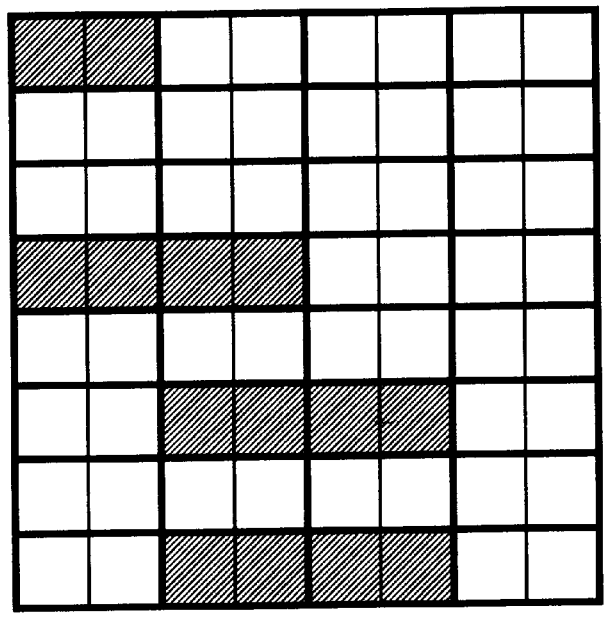

EXPANDX(A) denotes an image operator where 1 pixel in the input image at location (x,y) becomes a 2×1 tile of pixels in the output image with the left most pixel at location (2x,y). The output pixels in a given tile all assume the same value as the corresponding input pixel. FIG. 8D depicts the result of EXPANDX(A) applied to the image in FIG. 8C.

Figure 8E:
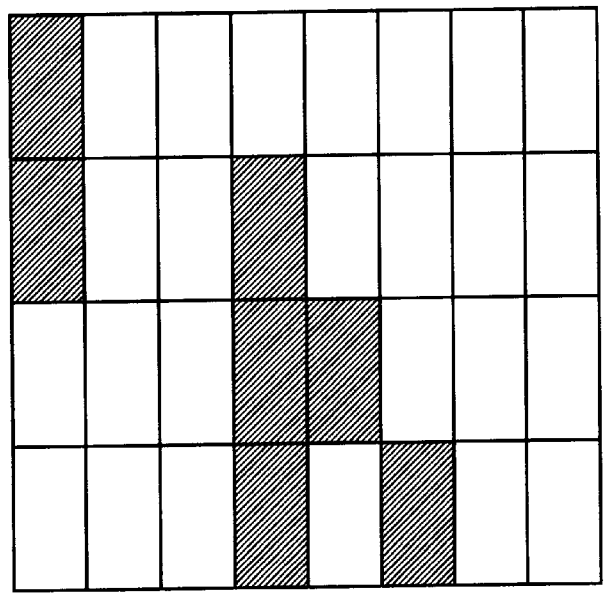
Figure 8F:
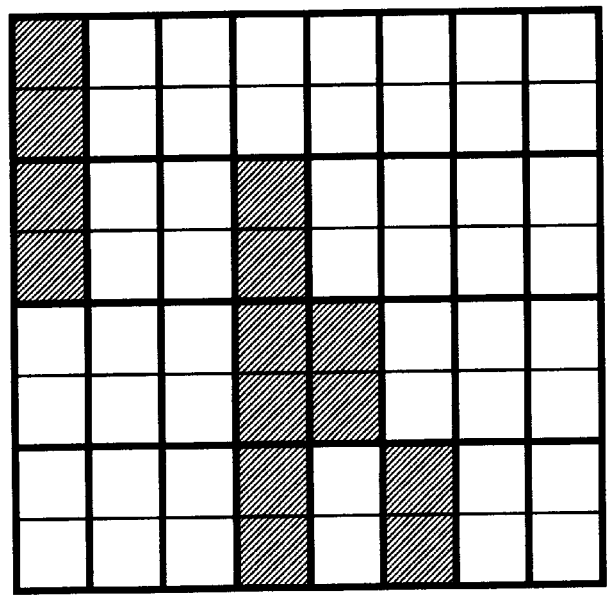

EXPANDY(A) denotes an image operator where 1 pixel in the input image at location (x,y) becomes a 1×2 tile of pixels in the output image with the top most pixel at location (x,2y). The output pixels in a given tile all assume the same value as the corresponding input pixel. FIG. 8F depicts the result of EXPANDY(A) applied to the image in FIG. 8E.

Each application of EXPANDXY expands both the x and y resolution by a factor of 2. Each application of EXPANDX expands the x resolution by a factor of 2. Each application of EXPANDY expands the y resolution by a factor of 2.

For conciseness, multiple reductions performed on a source image A will be written by appending additional arguments to the argument list specifying the threshold. For example REDUCEX(A,n,m,k) translates to three cascaded (recursive) reductions REDUCE(REDUCE(REDUCE(A,n),m),k). Since expansions have no second argument, cascaded expansions performed on a source image A will be written simply by appending the number of times the expansion is applied to the name of the operator. For example EXPANDX3(A) corresponds to EXPANDX(EXPANDX (EXPANDX(A))).

This disclosure will assume that the vertical and horizontal resolutions of the image are greater than of equal to 100 dpi. If such is the case, it will always be possible to find a reduction sequence where iterative applications of REDUCE_XY, REDUCE_X, and REDUCE_Y will produce an image where that the x and y resolution are both between 200 dpi and 100 dpi. This disclosure will refer to the x and y resolutions of that reduced resolution image as XRES(0) and YRES(0). The resolution of the image will be as close as possible to being square given the constraint that the resolutions will be reduced by powers of 2 and are constrained to lie in the range from 100 to 200 dpi.

For example if the resolution of the full resolution image were 300×300 dpi, application of REDUCEXY(I,1) would yield an RES0 image having resolution of 150×150 dpi. If the resolution of the image were 600×250 dpi, application of REDUCEX(REDUCEXY(I,1,1),1) would yield an image with resolution 150×125 dpi.

XRES(k) denotes the x resolution that results from applying k recursions of REDUCEX(A,n) to an image with XRES equal to XRES(0). YRES(k) denotes the resolution that results from applying k recursions of REDUCEY(A,n) to an image with YRES equal to YRES(0).

When this disclosure refers to an RES(j,k) image, this denotes an image having an x resolution equal to XRES(j) and a Y resolution equal to YRES(k).

Unless explicitly stated, all reductions in this disclosure will result from using value of 1 in the second argument that specifies the threshold for the reduction.

This disclosure will refer to the full resolution image input to the invention as IM. It will refer to the RES(i,j) version of this image as $IM_{RES(i,j)}$. Unless otherwise stated, 1 was used as the second argument in the reductions applied to the full resolution image to produce $IM_{RES(i,j)}$.

SCALEX (k) is equal to 2 to the power nx, where nx is the number of times REDUCEXY or REDUCEX have been applied to the full resolution image to derive a RESX(k) image. SCALEY(k) is equal to 2 to the power ny, where ny is the number of times REDUCEXY or REDUCEY have been applied to the full resolution image to derive a RESY (k) image.

The location in a RES(k,j) map that corresponds to (x,y) in the full resolution map is derived as (FLOOR(x/(scalex (k)),FLOOR(y/(scaley(j)))). Many pixels from the full resolution image may correspond to a single pixel in the reduced resolution image because of the tiling explained previously.

Since this disclosure deals with any input resolution and since resolutions of the reduced images derive from that input image vary, this disclosure will often use units of inches to specify dimensions at a given resolution. A span of w inches in an image of RESX(k) corresponds to a span of FLOOR(0.5+(w/scalex(k)) pixels in that image.

TOP LEVEL DESCRIPTION OF INVENTION

This disclosure will address the issue of segmenting the image into regions that are text and non-text. The output of the invention will be a map where only those pixels belonging to line drawing regions will be set.

This disclosure will specifically address such segmentation when all the graphics (non-text) regions present at the time of processing are assumed to be line drawings. The term line drawing segmentation will encompass all the processing steps involved in transforming the original binary image, where 0 and 1 are used to denote white and black respectively, into an output map that specifies the segmentation. In this output map, the value 0 is used to label a pixel as not being a member of a line drawing region and the value 1 is used to label a pixel as being a member of a line drawing region.

A line drawing region as identified by the invention will simply be an eight connected component of pixels having the line drawing label (1) in the output map.

Figure 9A:
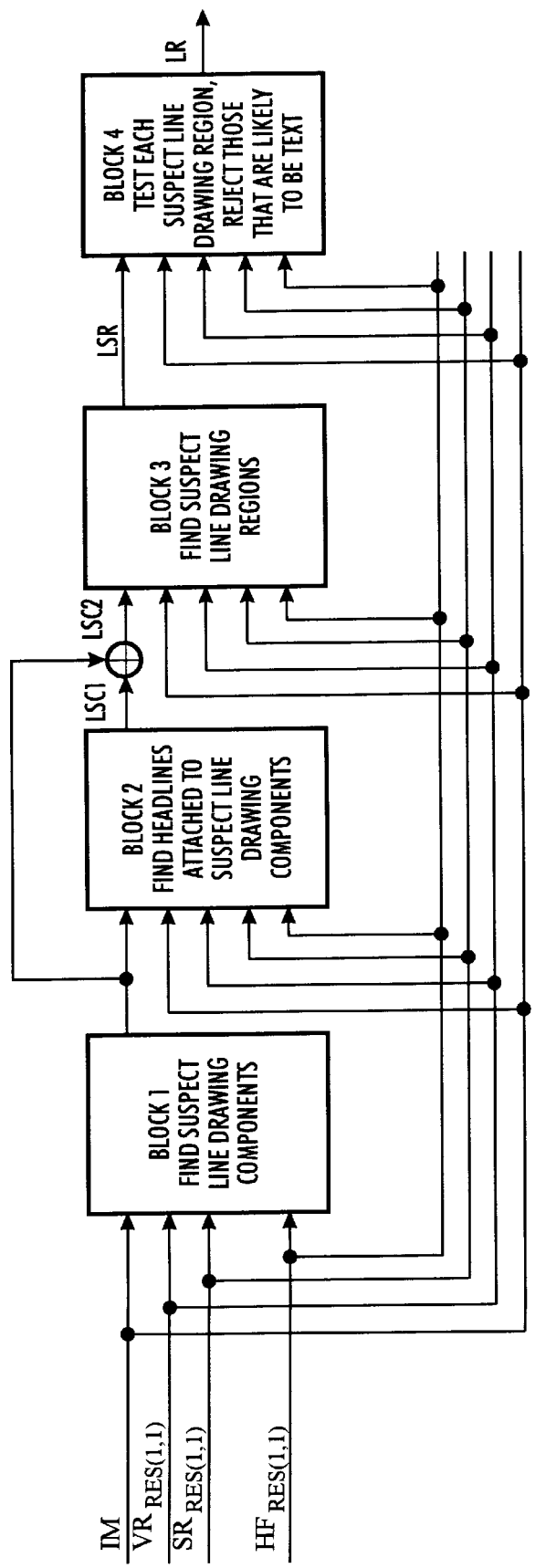
FIG. 9A is a systems diagram illustrating the top-level functions of the system of the present invention.

The block diagram in FIG. 9 depicts a top level diagram of the invention. There are four inputs to the system IM, the full resolution image, in the development it is assumed that halftones have been subtracted from this map.

$VR_{RES(1,1)}$, a RES(1,1) map containing only those pixels corresponding to pixels belonging to vertical rulings (long vertical lines) in I.

$ZR_{RES(1,1)}$, a RES(1,1) map containing only those pixels corresponding to pixels belonging to horizontal rulings (long horizontal lines) in I.

$HF_{RES(1,1)}$, a RES(1,1) map containing only those pixels corresponding to halftone regions in I.

The computation of these input maps fall with the realm of prior art and will not be part of this disclosure.

The invention is divided into four high level blocks, Block 1, Block 2, Block 3, and Block 4. Each major block is composed of one or more sub-blocks. A numeral following a period after block number will denote the sub-block number; for example, 4.3 denotes sub-block 3 of block 4.

Block 1 of the invention produces a map of RES(1,1) where each on-pixel signifies that the pixel is a member of a connected component that is suspected of belonging to a line drawing region. This map is referred to as the LSC map, which stands for line drawing suspect component map. FIG. 9C is representative of the output of this block given IM represented by FIG. 9B. Note that not all of the line drawing components show up in the map of FIG. 9C. Also note that some text shows up, some large text in the headline, and some of the smaller text that has some noise in the interline gap.

A defect of Block 1 is that text that is part of very tall headlines (character height greater than ½") will appear in the LSC map. Block 2 generates the HL map. Headlines that intersect with any components from the LSC map should show up in the HL map.

The invention subtracts HL from LSC. This disclosure will denote the LSC map prior to the subtraction as LSC1 and the LSC map with the headlines subtracted from it as LSC2. This is depicted in FIG. 9D.

The LSC2 map still does not define line drawing regions, it is merely a union of connected components that are likely to be parts of line drawing regions. Some line drawing components may be missing from it. Also, line drawing components that occur in clusters should be merged and represented as a single connected component in the output of the invention. Block 3 functions to produce a map, called the line drawing suspect region map (LSR map) in which each connected component in the map corresponds to a complete area of the image that is suspected of being a line drawing.

FIG. 9E illustrates a text region that is incorrectly included in the LSR map. Block 4 will examine each region (connected component) in the line drawing suspect region map to determine if that region is actually a line drawing region or a text region. This block implements a binary decision on each region in LSR map. The regions that pass the test will be added (union) to the output map, the line drawing region (LR) map. With the input represented by FIG. 9E, Block 4 would test the two regions (connected components) and should reject the text region as being line drawing and should accept the line drawing region. Only the line drawing region should appear in the line drawing region (LR) map, the output of the invention, represented by FIG. 9F.

Each block is described in detail below.

Block 1—Generate Line Drawing Suspect Component (LSC) Map

This block functions to make a map of RES(1,1) that is a union of connected components that are likely to be members of a line drawing region. The output of this block is the line drawing suspect component (LSC) map. The basic premise is that the vast majority of text lines are bounded above and below by relatively long, unbroken horizontal white runs which correspond to the spaces between the text lines. A white run of length N is an uninterrupted horizontal sequence of N white pixels.

Figure 10A:
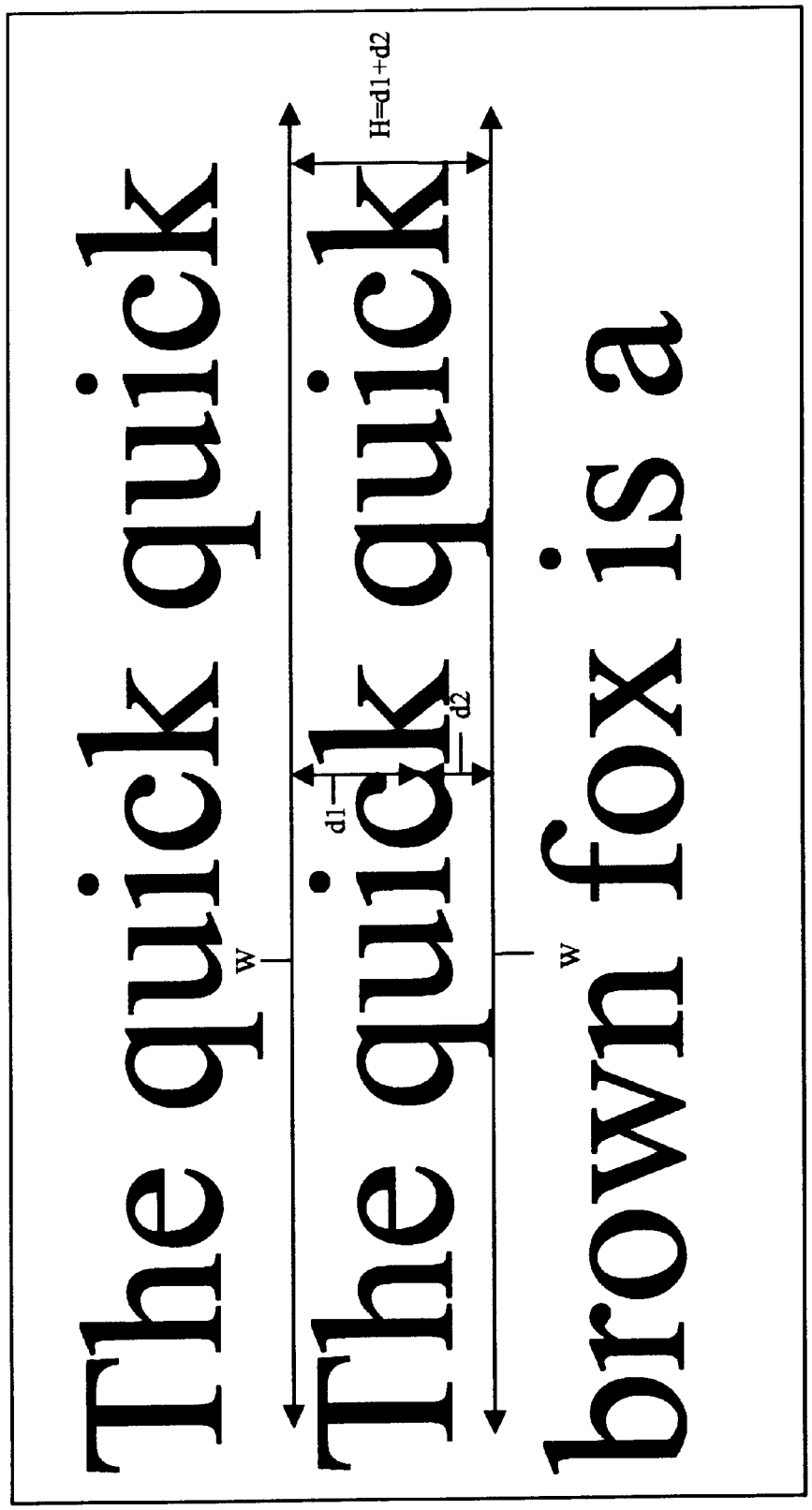
FIGS. 10A–10C illustrate how text regions are identified according to the method of the present invention.

For a black pixel with coordinate (x,y) occurring in such a well-behaved text line, there will be a nonnegative d1 such that (x,y−d1) will occur within the white space immediately above the text line. Similarly there will be a nonnegative d2 such that (x,y+d2) will occur within the white space below the line. So it is expected that we will find a d1 (a displacement up) and d2 (a displacement down) where d1+d2<=H, where H is the maximum line height we expect to encounter, such that (x,y−d1) and (x,y+d2) both occur within white runs that span the same range of x for at least W pixels. This is illustrated in FIG. 10A.

Figures 10B, 10C:
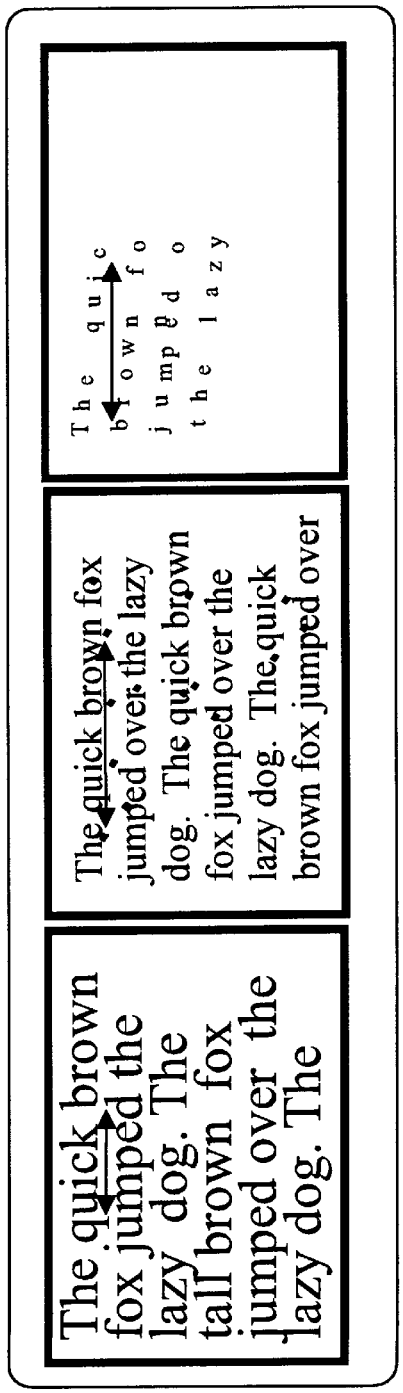

In the non-ideal cases, there may be situations where descenders from characters in a line overlap in y with ascenders from the line immediately below. Text lines may have black noise pixels scattered in the spaces between them. Text lines may be slightly skewed (tilted) from the horizontal. These situations are illustrated in FIG. 10B. These factors limit the length of W.

This disclosure will now introduce a text cover (TC) map that is intended to include most text components but to exclude a large percentage of line drawing components. The notion is that line drawing components generally do not line up horizontally like text, so that for a suitably large W, there will be a corresponding H that is large enough accommodate the height of most text lines, but will fail to accommodate most line drawing configurations.

When dealing with print of increasing height, H should be allowed to increase to accommodate the more distant spacing between the white space above the text line and the white space below the text line. As the height of a text line increases, the height of the interline spacing usually increases proportionally. For increasing H, it is reasonable to require increasingly longer white runs, hence larger values of W. The gaps between adjacent text lines will tend to increase as text height increases, thus increasing the chances of being able to trace out longer white horizontal runs in that interline spacing, even given the potential pitfalls illustrated by FIG. 10B. This effect is illustrated in FIG. 10C. So it is reasonable to set W/H constant while accommodating a range of H to deal with the likely range of line heights.

The preferred embodiment, rather then dealing with a continuous range of heights, will use a set of three heights, H1, H2, and H3, where H1<H2<H3. Corresponding to each maximum allowable height, there will be a width W1, W2, and W3, where W1<W2<W3, which will dictate the minimum width of an acceptable white run length corresponding to that maximum height. H3 will be large enough to accommodate most text, but small enough so that it will be smaller than the height of most line drawing regions.

Assume W is odd and when the disclosure refers to W/2, FLOOR(W/2) is intended.

The RES(1,1) map to be constructed, TC, has the property that a pixel at the coordinate pair in TC that corresponds to (x0,y0) in the full resolution input map, I, will be set, if and only if there exists a pair (W,H) from the set of pairs {(W1,H1),(W2,H2),(W3,H3)}, and four positive integers k, m, n, and q where k<=y0, m>=y0, (m−k)<=H, n<=x0, q>=x0, and (q−n)>=W such that I(i,k)=0 and I(i,m)=0 for all i in the range (n<=i<=q). (This coordinate pair in the RES(1,1) map TC is (FLOOR(x0/scalex(1)), FLOOR(y0/scaley(1))).) This is the same as saying a pixel in the RES(1,1) map will be set if and only if a corresponding pixel in the full resolution map can be sandwiched between two horizontal white runs which both share identical segments greater than or equal to W over some range of x values that includes the x coordinate of that pixel. This is illustrated in FIG. 11.

TC can be constructed using the image operators COMPLEMENT, ERODE, CLOSE, and DILATE as follows:

A=ERODE(COMPLEMENT(IM),RECT(W1,1))
B=CLOSE(A,RECT(1,H1)
C=DILATE(B,RECT(W1,1)
A=ERODE(COMPLEMENT(IM),RECT(W2,1))
B=CLOSE(A,RECT(1,H2))
C=UNION(C,DILATE(B,RECT(W2,1))
A=ERODE(COMPLEMENT(IM),RECT(W3,1))
B=CLOSE(A,RECT(1,H3))
C=UNION(C,DILATE(B,RECT(W3,1))

Then C can be reduced to RES(1,1) yielding TC. However, this requires three full resolution maps to store intermediate computations, even though the resolution of the resulting map is reduced to RES(1,1). In the preferred embodiment, a map that approximates TC as given above is more efficiently computed using RES(1,1) maps to store the intermediate results. In effect, this means that the process of locating text regions preferably occurs on a low-resolution version of the original image data. This computation proceeds as follows:

Initialize three maps A1, A2, and A3 of RES(1,1) to have all 0 pixel values. Find all white horizontal runs in the full resolution image.

Let (xL,y0) correspond to the left endpoint of a given run, let(xR,y0) correspond to the right endpoint of a given run.

In map A1, for each white run in IM having a length exceeding W1, set the pixel at coordinate pair (FLOOR(i/scalex(1)),FLOOR(y0/scaley(1))) for each i in the range (xL+FLOOR(W1/2)<=i<=xR−FLOOR(W1/2)). This "erodes" the white run, or in other words truncates FLOOR(W1/2) pixels off the left and right end of each white run from IM, then renders the reduced resolution version of that truncated white run as a black run in the appropriate location of map A1.

In map A2, for each white run in IM having a length exceeding W2, set the pixel at coordinate pair (FLOOR(i/scalex(1)),FLOOR(y0/scaley(1))) for each i in the range (xL+FLOOR(W2/2)<=i<=xR−FLOOR(W2/2)).

In map A3, for each white run in IM having a length exceeding W3, set the pixel at coordinate pair (FLOOR(i/ scalex(1)),FLOOR(y0/scaley(1))) for each i in the range (xL+FLOOR(W3/2)<=i<=xR−FLOOR(W3/2)).

In producing A1, A2, and A3, it is assumed all pixels outside the range of the image are white. For example, a pixel at location I(0,0) will have an infinite run of white pixels to the left of it.

Maps TC, TC1, TC2, and TC3 are produced from A1, A2, and A3 as follows:

B=CLOSE(A1,RECT(1,FLOOR(H1/scaley(1)))
TC1=DILATE(B,RECT(FLOOR(W1/scalex(1))−DELTA,1))
B=CLOSE(A2,RECT(1,FLOOR(H2/scaley(1)))
TC2=DILATE(B,RECT(FLOOR(W2/scalex(1))−DELTA,1))
B=CLOSE(A3,RECT(1,FLOOR(H3/scaley(1)))
TC3=DILATE(B,RECT(FLOOR(W3/scalex(1))−DELTA,1))
TC=UNION(TC1,TC2,TC3)

The constant DELTA is subtracted from the width of the structuring element in the dilation. This is to ensure that thin stokes, attributable to line drawing components, that cannot be sandwiched at the higher resolution will appear in the complement of TC. A DELTA of 1 (that is, subtracting the length of one pixel from the horizontal structuring element W in the above calculations) is sufficient for accomplishing this. Such narrow black strokes will interrupt white runs at the full resolution, but when those white runs are rendered to the low resolution, they may bridge that narrow interruption. Since text lines will usually have sufficient margins of white to the left and right, the narrower structuring element will not impede the ability of the maps to cover text lines.

The pairs (W1,H1),(W2,H2), and (W3,H3) should be chosen so that the on-pixels in TC will cover any black pixels corresponding to text in most text lines, yet should not cover most line drawing components. With respect to the full resolution image (XRES/2,YRES/8), (XRES,YRES/4), and (2XRES,YRES/2) are reasonable values.

Vertical rulings can be either text or line drawing components. Because of this ambiguity, they are added to TC since they very well may be part of the text, as in a table.

TC=UNION(TC, VR$_{RES(1,1)}$)

To capture pixels which do not correspond to reasonably sized, well-behaved text lines, and may rather correspond to line drawing components, the invention will construct a map of those pixels which are not included in the text cover map.

A=SUBTRACT(IM$_{RES(0,0)}$,EXPANDXY(TC))

This subtraction is done at RES(0,0), hence the EXPAND operator applied to TC. This creates map A at resolution RES(0,0). The map A contains those black pixels which cannot be sandwiched as described above. It is desired to capture all the components connected to those pixels. So A is used as a seed in the following seed fill:

B=SEED_FILL(IM$_{RES(0,0)}$, A)

The map output by Block 1, LSC, is simply the RES(1,1) version of B above:

LSC=REDUCEXY(B,1)

Figure 12A:
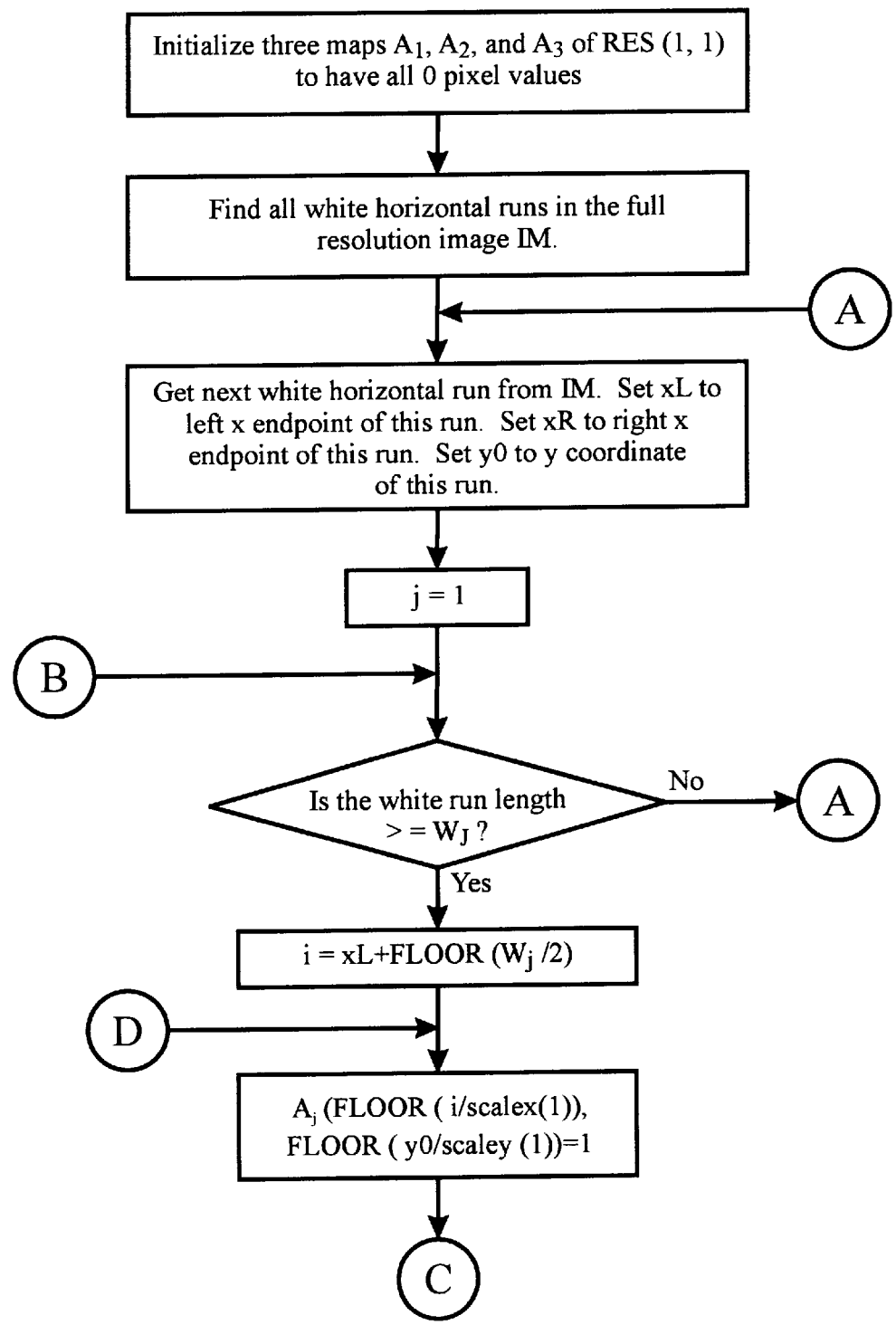
FIGS. 12A–12B represent a flowchart of one specific function according to a preferred embodiment of the present invention.
Figure 12B:
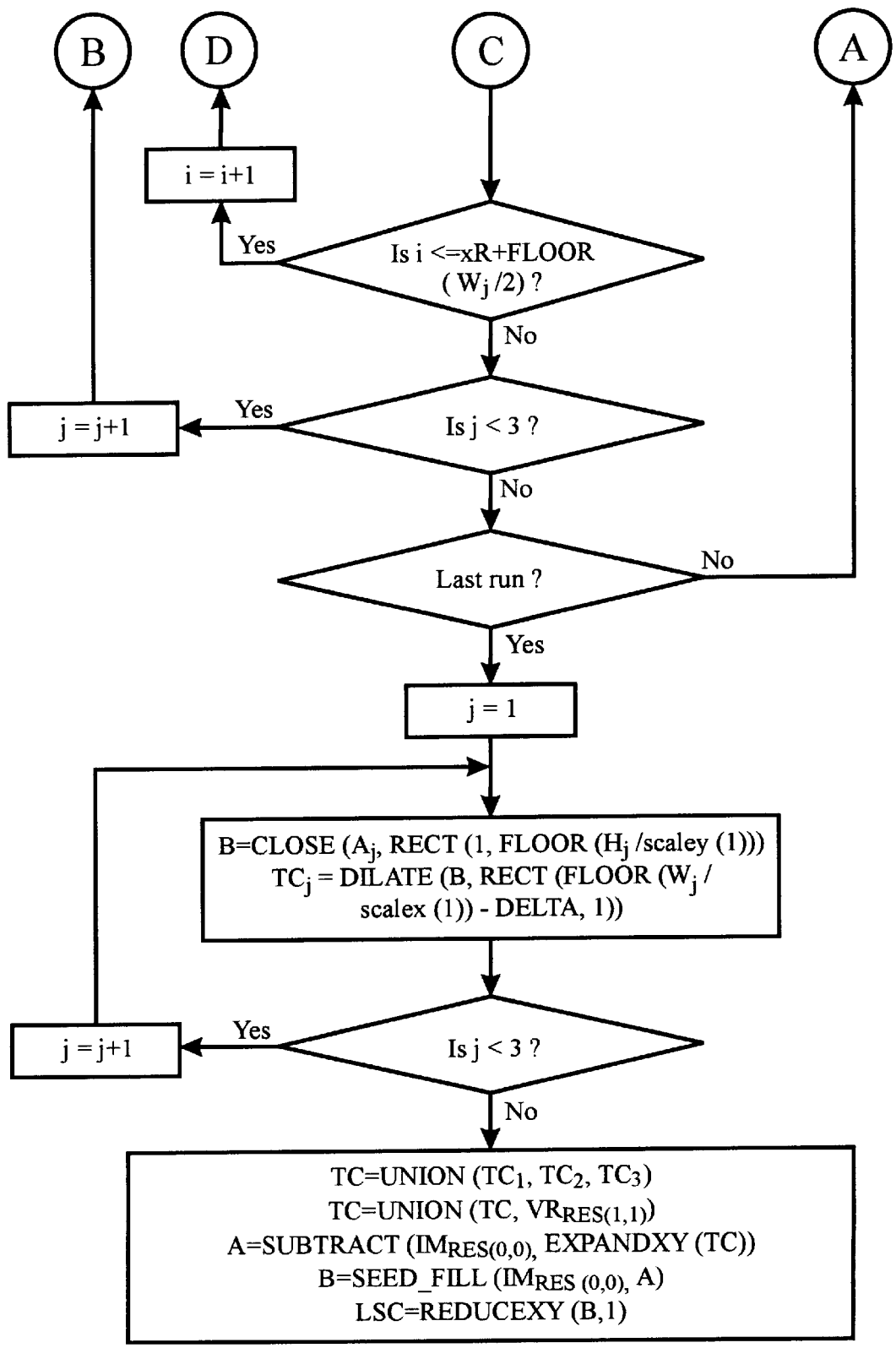

The flowchart in FIG. 12 summarizes the processing done by Block 1.

Block 2: Remove Headlines From Line Drawing Component Map

Block 1 of the invention has a tendency to include parts of very large headlines in the LSC map. This is illustrated by FIG. 9C. In fact, any text where the character height exceeds ½" will appear in LSC. Block 2 of the invention is designed to construct a map, HL, of any headlines that intersect any on-pixels in LSC. HL is subtracted from LSC.

The same technique used to make the text cover maps in Block 1 is used to make an additional text cover map TC4, using the parameters (W4,H4), in fact, this can be done efficiently in conjunction with the construction of TC1, TC2, and TC3 in Block 1. But to avoid confusion, this disclosure will view the construction as a separate step.

(W4,H4) are chosen so that the tallest headline can be sandwiched. For example, if headlines with one inch character heights are to be classified as text, (W4,H4)=(3×RES, YRES) would be a reasonable choice.

A headline may be composed of both upper case and lower case characters. If part of a headline is not sandwiched by (W3,H3), it probably means that part of the headline has a height >H3, however, since this part of the headline may be an upper case character in a headline that has a mix of upper and lower case, other parts of the headline may very well have heights less than H3 but greater than H2 (in this case, H2 happens to be H3/2, and it is reasonable to expect that the height of an upper case character in a headline will be no more than twice that of a lower case character in the same headline). So problematic headlines with characters that are not completely within TC, will probably have all their parts within A where A is given as:

A=SUBTRACT(UNION(TC4,TC3),UNION(TC2,TC1)).

To create a map where such headlines will tend to occur as single connected components the invention constructs a map B given by:

B=CLOSE(ISECT(IM$_{RES(1,1)}$,A),(XRES(1)/2,1)).

This is intended to bridge the horizontal spaces between the characters in the headlines. The problem regions in B are those that are connected to pixels from the LSC map that are within TC4, this is given by C in the following expression.

C=SEED_FILL(B,ISECT(TC4,LSC))

Ideally, C should contain all of the headlines that were not completely within TC. Ideally, each of these headlines will show up as single connected components. However, parts of line drawing regions will also show up in C. The invention will perform a test on every region (connected component) in C to determine if that region is likely to be a headline or not. All regions deemed to be headlines are added (unioned) to the headline map HL.

To be classified as a headline, the region must satisfy all the following criteria:

HEIGHT(region)<=MAX_HEADLINE_HEIGHT.
HEIGHT(region)>H2
WIDTH(region)/HEIGHT(region)>MIN_ASPECT After application of block 4.2 on this region, block 4.4 must declare this region to be text. Blocks 4.2 and 4.4 to be defined later.

HEIGHT and WIDTH refer to the height and width of the bounding box of the region.

MAX_HEADLINE_HEIGHT should be selected to accommodate the maximum character height with the caveat that making the value larger increases the number of line drawing regions on which test 4 above is applied. A reasonable choice is 3XRES(1)/2, this would accommodate headlines that are 1.5 inches in height.

Setting MIN_ASPECT to 1 will accommodate the narrowest of headlines.

The description of blocks 4.2 and 4.4 is deferred until the description of block 4, which expands on the notion of making a binary decision of whether a given region is text or non text.

Criterion 4 is not tested unless criteria 1, 2, and 3 are satisfied, since it imposes a significant computational burden.

Figure 13A:
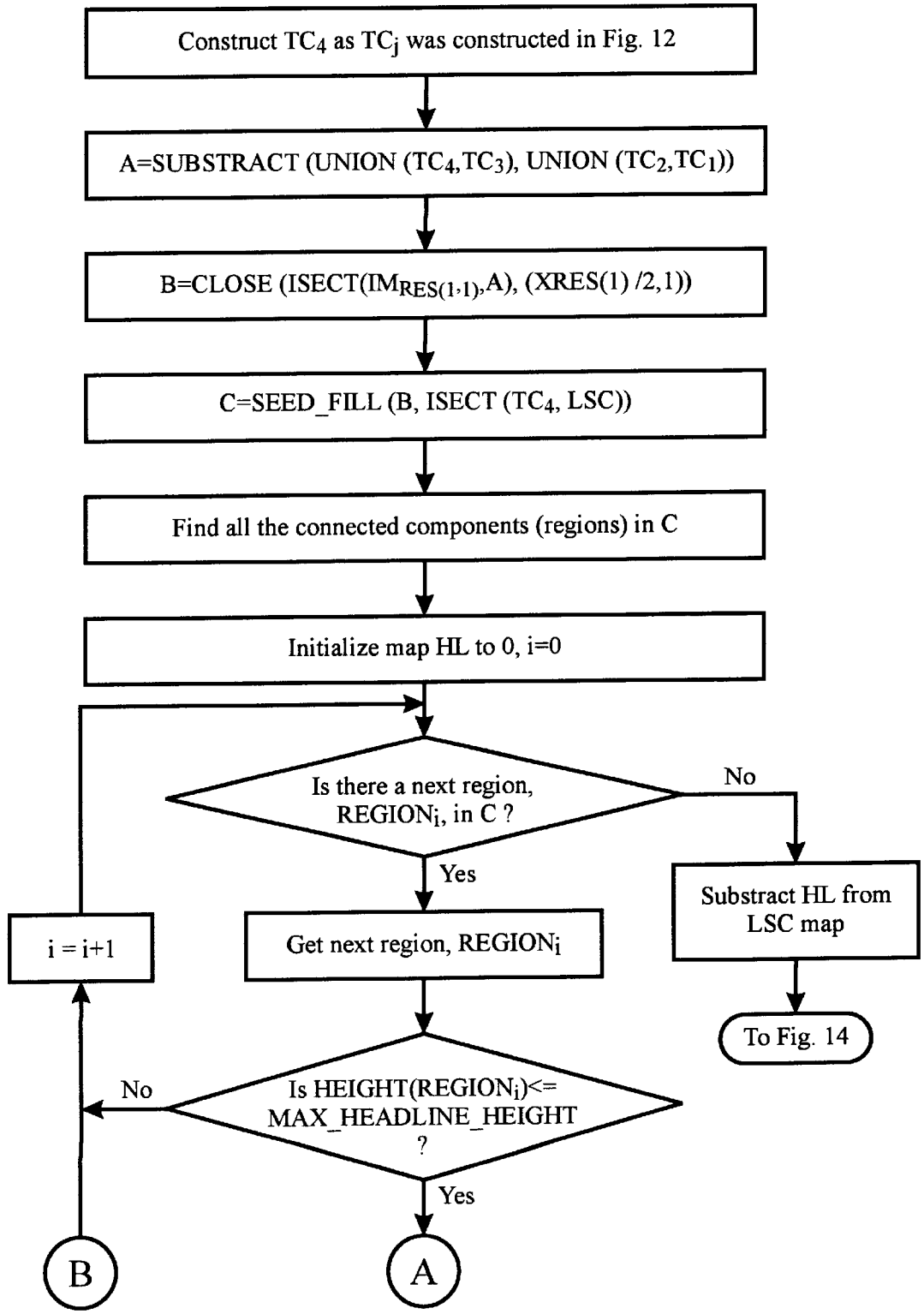
FIGS. 13A–13B represent a flowchart of another function according to a preferred embodiment of the present invention.
Figure 13B:
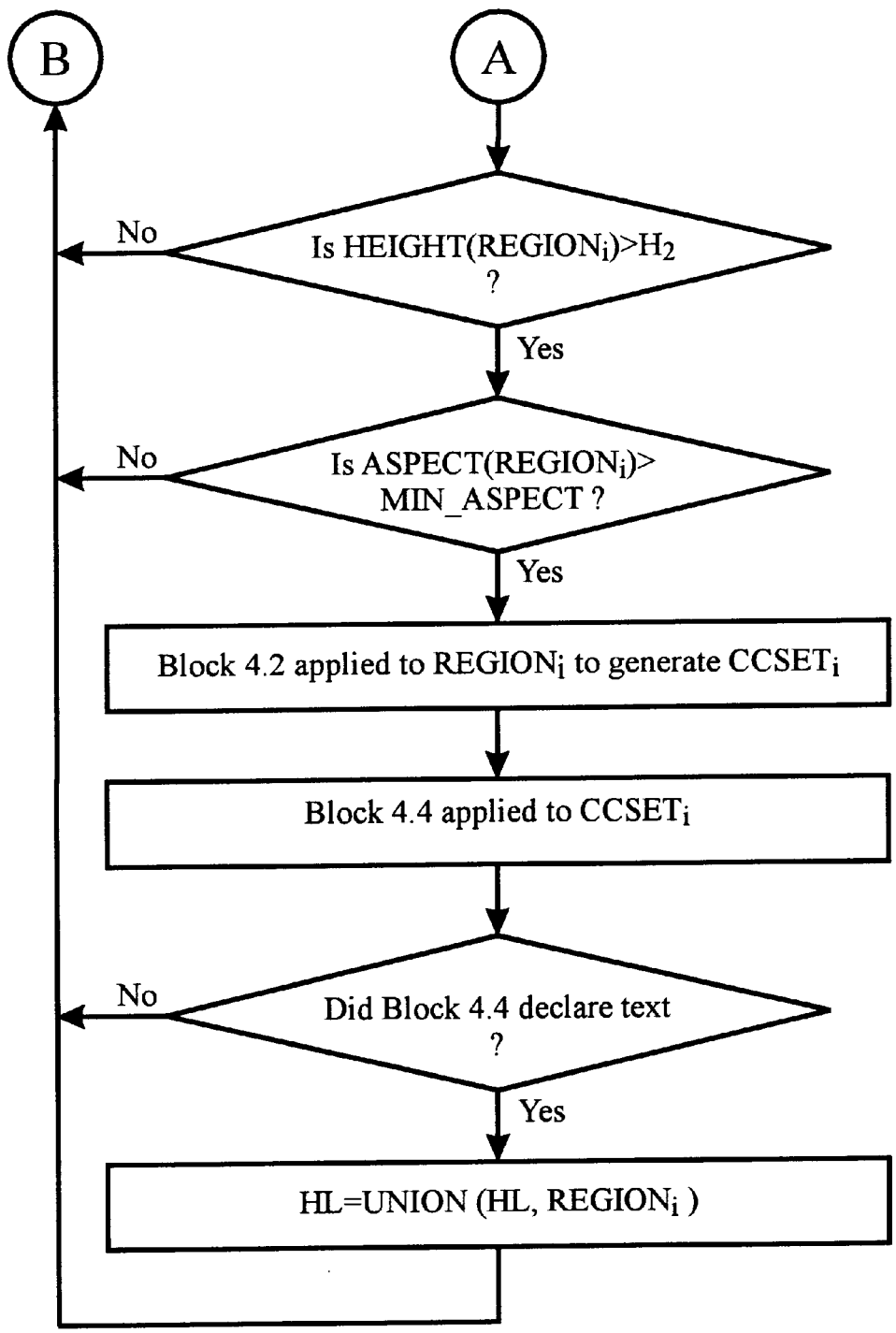

The HL map is subtracted from LSC. This disclosure uses LSC1 to refer to the map prior to the subtraction and LSC2 to refer to the map after the subtraction. The flow chart depicted in FIG. 13 outlines the design of block 2.

Block 3: Generate Line Drawing Suspect Region Map

The LSC map contains components whose size or spatial arrangement precluded their being entirely contained in TC of Block 2. However, a given line drawing region is usually a mix of components, some of which would be entirely contained in LSC and some of which would not. In fact, since a line drawing region can be composed of a mixture of both text and graphical components, such as in flowcharts, block diagrams, or maps, one might expect that none of the text components in such regions would appear in the LSC map.

Also, body text may erroneously appear in LSC in situations where there is noise between two text lines (this is illustrated by FIG. 9D), or when the text spacing is so tight that descenders from a given text line overlap with the ascenders of the text line immediately below (as in the left most example in FIG. 10B). Block 3 is designed to mitigate such effects by taking advantage of the spatial clustering of like components. Line drawing components are clustered together to form line drawing regions. Text components are tightly clustered together in body text to form text regions.

Since long horizontal and vertical runs of white serve to separate distinct sections of a document, this invention will create two RES(1,1) maps called HGUTTERS and VGUTTERS from IMRES(1,1) after an initial closing to merge intraword gaps between characters. All the on-pixels in the HGUTTERS map belong to horizontal runs of white exceeding XRES(1) in length. All the pixels in VGUTTERS belong to vertical runs of white exceeding YRES(1) in length. The rationale being that such long runs of white serve as region separators and no merging should take place across them.

A=COMPLEMENT(CLOSE(IM$_{RES(1,1)}$,RECT(XRES(1)/16, YRES(1)/8))

HGUTTER=OPEN(A,RECT(XRES(1),1))

VGUTTER=OPEN(A,RECT(1,YRES(1)))

The map of all the on-pixels belonging to components which are presumed to be text can be computed as:

A=SUBTRACT(IM$_{RES(1,1)}$,LSC).

This invention will segment significantly large areas of the image where there is a dense clustering of on-pixels in A as body text. Such regions can be revealed by first performing a closing of A intended to agglomerate into single connected components those on-pixels which are closely packed:

B=CLOSE(A,RECT(XRES(1)/4,YRES(1)/4))

However, this may merge across vertical gutters, hence vertical gutters are subtracted from B. However, since horizontal gutters may merely correspond to interline white space, they are not subtracted:

C=SUBTRACT(B,VGUTTER)

This is followed by an opening to remove any arrangements of on-pixels that do not have enough girth (i.e., a predetermined size) to be considered body text:

D=OPEN(C,(XRES(1),YRES(1)))

Any on-pixels from C connected to on-pixels from D appear in E, where

E=SEED_FILL(C,D).

Since the pixels in E belong to relatively large clusters presumed to be body text, it is reasonable to merge any small horizontal gaps between those clusters to create the BODY_TEXT map. The present invention thus identifies clusters of areas likely to be text regions as "body text" when the clusters are of a predetermined size.

BODY_TEXT=CLOSE(E,RECT(XRES(1),1)

The pixels that are in A, but not in BODY_TEXT may belong in line drawing or text regions, this will be determined later. At this point STRAY_TEXT map contains these pixels. The closing helps merge small gaps in these components:

STRAY_TEXT=CLOSE(SUBTRACT(A,BODY_TEXT), RECT(XRES(1)/4,1))

The invention now constructs a suspect line drawing region map with the constraint that this map cannot contain any pixels from BODY_TEXT. The effect is to create a "refined" set of black pixels attributable to line drawing components. So the initial step is to subtract the BODY_TEXT mask from LSC:

LSC=SUBTRACT(LSC,BODY_TEXT)

The invention performs a closing on LSC to agglomerate densely packed clusters of on-pixels in the LSC map. This is the initial line drawing suspect region (LSR) map. The line drawing regions emerge from connected clusters in the LSC map after the closing merges clusters that are densely packed relative to the structuring element dimensions used for the closing:

LSR=CLOSE(LSC,RECT(XRES(1),YRES(1)))

Then both horizontal and vertical gutters are subtracted from the map. Also, because of the closing it is necessary to subtract BODY_TEXT once again:

LSR=SUBTRACT(LSR,HGUTTERS)

LSR=SUBTRACT(LSR,VGUTTERS)

LSR=SUBTRACT(LSR,BODY_TEXT)

The invention adds to the LSR map any components from STRAY_TEXT that touch on-pixels in the current LSR map.

LSR=UNION(LSR,SEED_FILL(STRAY_TEXT,LSR))

Block 3 is summarized by the flowchart in FIG. 14.

Block 4—Classify Each Suspect Line Drawing Region in the LSR Map As Text or Line Drawing (Non Text)

It is possible that some of the connected components in the LSR map are actually parts of body text regions. Block 4 serves to filter such regions from the LSR map. At this stage all the segmentation is done and block 4 just selects those regions likely to be text and rejects those regions likely to be line drawing (nontext). Only those regions classified as non-text will appear in the output map, LR. This block has a much higher computational burden per unit area of the image processed than the preceding blocks. However, economy is achieved because most text regions have been filtered from the regions that this block examines. This block will usually examine only a small portion of the image. Statistically, this block should process all line drawing regions the system identifies and will process only the very small minority of body text regions that fall through to this block.

Figure 15:
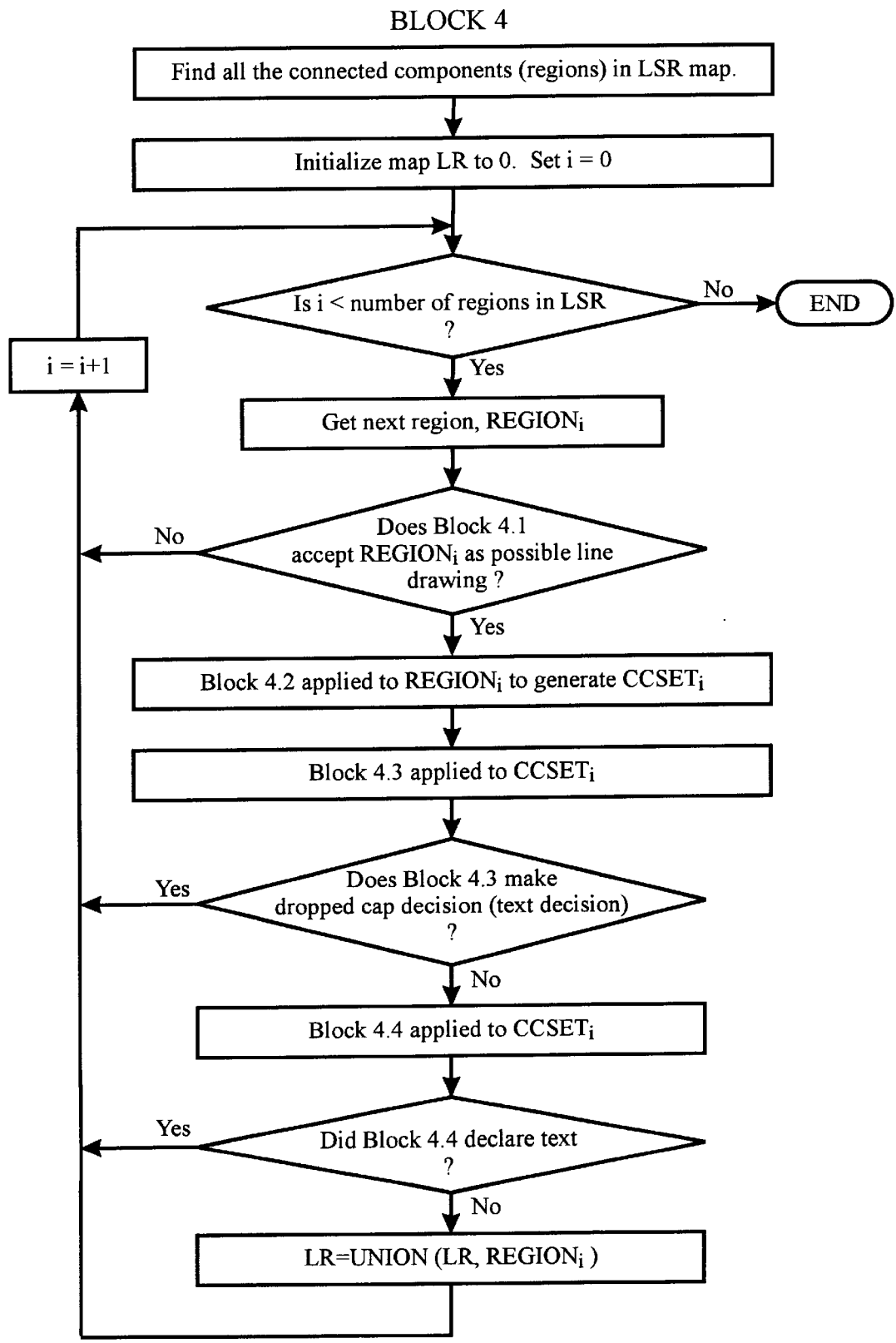
FIG. 15 is a flowchart showing another specific function according to a preferred embodiment of the present invention.
Figure 16:
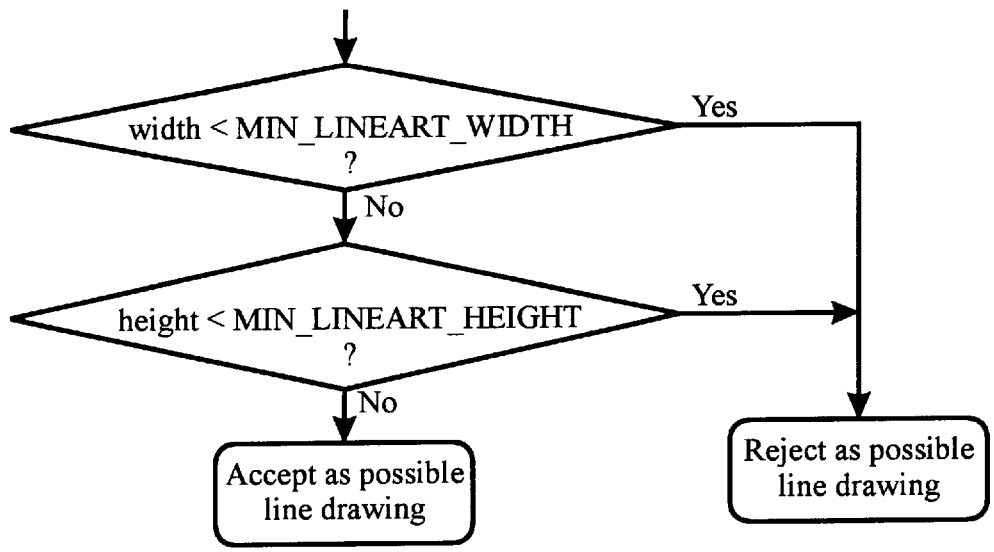
FIGS. 16, 17, 18, 19, 20A–20B, and 21A–21F each represent flowcharts of individual functions according to a preferred embodiment of the present invention.
Figure 17:
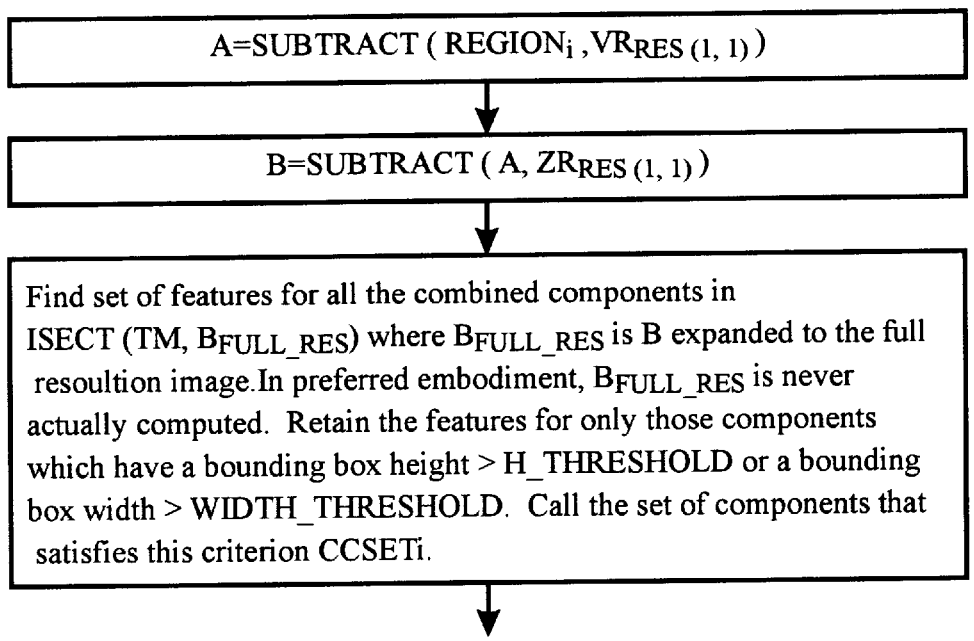

The flowchart in FIG. 15 describes the top level organization of block 4. Block 4 first finds all the connected components in the suspect line drawing region map, LSR, each of these corresponds to a region to test. For each region, block 4.1, described by FIG. 16, performs a test based on gross characteristics of the suspect line drawing region. If that test supports a line drawing decision, the region is passed to block 4.2, described by FIG. 17; otherwise that region will not appear in LR and the next region is processed. For each region, block 4.2 finds all the connected components in the full resolution image, IM, that lie within the boundaries of $REGION_i$. Only connected components that either have a bounding box width >W_THRESHOLD or have a bounding box height >H_THRESHOLD are retained. Components that do not meet the threshold are filtered out as noise. This disclosure will refer to the resulting set of connected components corresponding to $REGION_i$ as $CCSET_i$.

W_THRESHOLD and H_THRESHOLD are set to accept the body of most unbroken characters in the smallest point size under consideration. XRES/24 and YRES/24 are reasonable values for W_THRESHOLD and H_THRESHOLD respectively.

Figure 18:
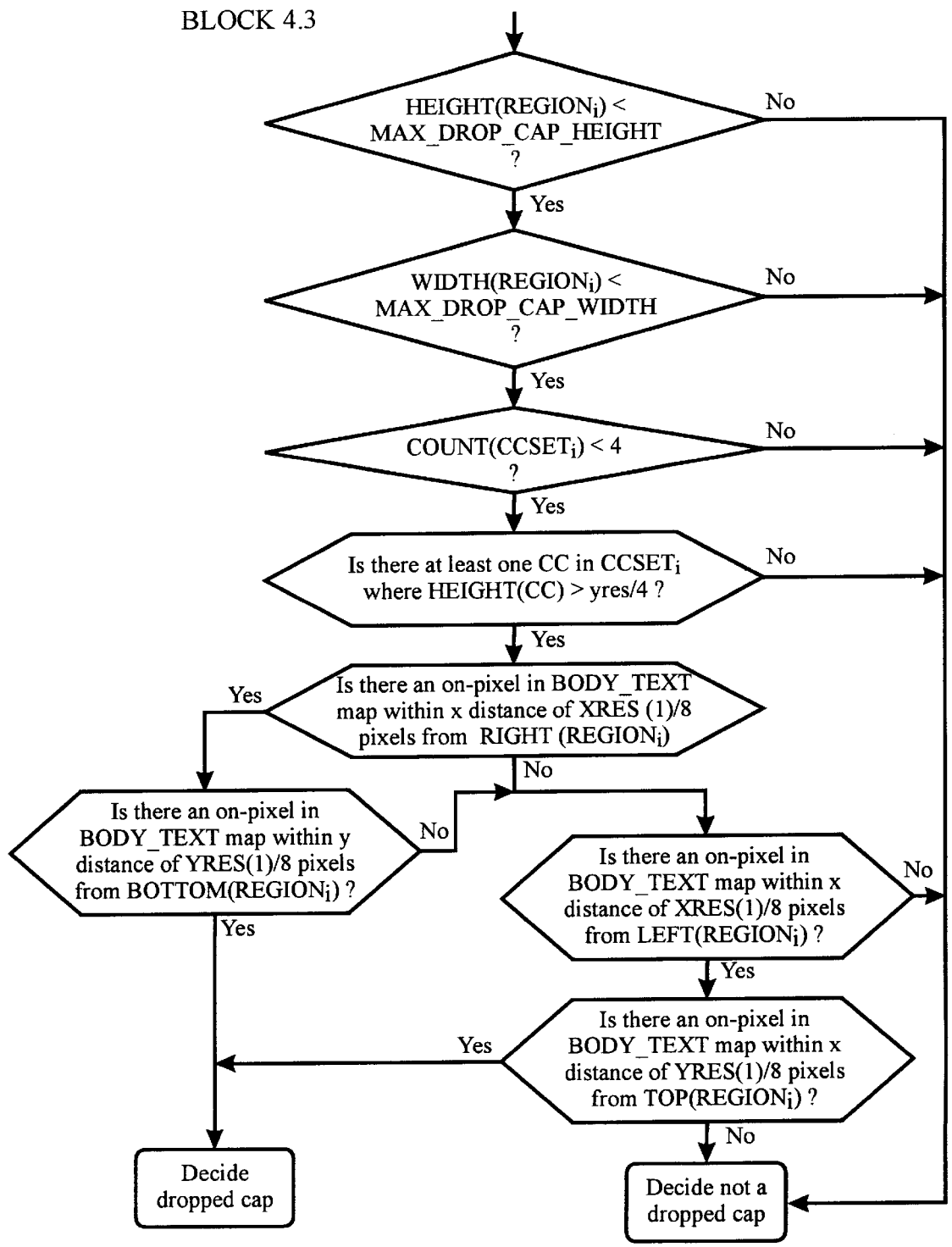

Block 4.3, described by FIG. 18, determines whether or not $REGION_i$ is a dropped-cap. If block 4.3 declares $REGION_i$ a dropped-cap, $REGION_i$ will not appear in LR and the next region is submitted to block 4.1. Otherwise, $REGION_i$ is submitted to block 4.4.

Block 4.4 is designed to examine the spatial arrangement of all the connected components to determine whether $REGION_i$ is largely text or not. If the region is determined not to be largely text, only then will it be added (unioned) to LR. Processing for the next region then begins at block 4.1.

Block 4.1

If the width or height of the bounding box are insufficient, width <MIN_LINEART_WIDTH or height <MIN_LINEART_HEIGHT, Block 4.1 rejects the region as being a line drawing region. 2XRES(1)/3 and 2YRES(1)/3 are reasonable choices for MIN_LINEART_WIDTH and MIN_LINEART_HEIGHT respectively.

Block 4.2

Block 4.2 finds a feature vector for each connected component in the full resolution image that is contained in $REGION_i$, but does not correspond to a ruling. Note that $REGION_i$ is represented by a RES(1,1) map, so that there is an implicit expansion to full resolution when $REGION_i$ is referenced with respect to the full resolution image.

The ruling maps are subtracted from $REGION_i$ to preclude vertical and horizontal rulings from showing up in the connected components extracted.

$$A = SUBTRACT(REGION_i, VR_{RES(1,1)})$$

$$B = SUBTRACT(A, ZR_{RES(1,1)})$$

To address the disparity between the resolution of map B (which is RES(1,1)) and the full resolution image, this disclosure will refer to map $B_{FULL}\_RES$. $B_{FULL}\_RES$ is map B expanded to full resolution. In preferred embodiment, $B_{FULL}\_RES$ is never actually computed. But, rather, the extraction of connected components from IM is constrained to those pixels contained in $B_{FULL}\_RES$.

Block 4.2 finds a feature vector for all the connected components in ISECT(IM,$B_{FULL}\_RES$), but retains the feature vectors for only those components which have a bounding box height >H_THRESHOLD or a bounding box width >WIDTH_THRESHOLD. Call the set of connected components corresponding to $REGION_i$ that satisfies this criterion $CCSET_i$.

$COUNT(CCSET_i)$ signifies the number of connected component feature vectors in $CCSET_i$.

$CC_k$ signifies the feature vector for the kth component in a given CCSET.

The following set of features is extracted and retained for each connected component in $CCSET_i$:

TOP(CC) signifies the y coordinate corresponding to the top edge of the bounding box of a given component CC.

BOTTOM(CC) signifies the y coordinate corresponding to the bottom edge of the bounding box of a given component CC.

LEFT(CC) signifies the x coordinate corresponding to the left edge of the bounding box of a given component CC.

RIGHT(CC) signifies the x coordinate corresponding to the right edge of the bounding box of a given component CC.

WIDTH(CC) signifies RIGHT(CC)−LEFT(CC)+1

HEIGHT(CC) signifies BOTTOM(CC)−TOP(CC)+1

MASS(CC) signifies the number of on-pixels (black) in a given component CC.

NRUNS(CC) signifies the number of black horizontal runs in a given component CC.

(SEEDX(CC),SEEDY(CC)) signifies a coordinate pair from one of the pixels in the connected component.

Block 4.3

Dropped caps and raised caps often have character heights that would preclude their being contained by TC. Also, they may be isolated by enough white on all sides so that they appear in the LSR map as a separate region. Block 4.3 is designed to identify any regions that are dropped caps.

For a region to be declared a dropped cap region, the following criteria all must be met:

The height of the region has to be less than the maximum dropped cap height allowed, assume 1".

The width of the region has to be less than the maximum dropped cap width, assume 1".

There have to be fewer than four connected components in $CCSET_i$

At least one of the components in $CCSET_i$ has to have a height greater than ¼ of an inch.

There has to be an on-pixel in the BODY_TEXT map within a horizontal distance of XRES(1)/8 pixels from the right edge of the region and there has to be an on-pixel in the BODY_TEXT map within a vertical distance of YRES(1)/8 pixels from the bottom edge of the region. Or, there is the possibility that the image is upside down, so an on-pixel in the BODY_TEXT map within a horizontal distance of XRES(1)/8 pixels from the left edge of the region and an on-pixel in the BODY_TEXT map within a vertical distance of YRES(1)/8 pixels from the top edge of the region will also satisfy this criterion.

Block 4.4

Block 4.4 is further partitioned into two sub blocks, block 4.4.1 and block 4.4.2. Block 4.4.1 is designed to handle situations where there are, on average, fewer than 50 connected components per square inch in a given region. Block 4.4.2 is designed to handle situations when there are 50 or more connected components per square inch. The output of each of these blocks is the decision of whether or not $REGION_i$ is dominantly text.

Block 4.4.1 first makes a component-by-component decision about whether or not a given component in a given CCSET is text or not. Both the features of a given component in isolation and the spatial arrangement of the component with respect to other components are taken into account when making the per component decisions. Then, after each component is classified as text or non-text, the individual per component decisions are fused into a global decision for CCSET. This is significantly different than block 4.4.2, in which there is no per component decision step.

Block 4.4.1 functions best when the connected component density is low. Block 4.4.2 functions best when the component density is high, and it is certainly less computationally expensive than 4.4.1 when that is the case.

Figure 19:
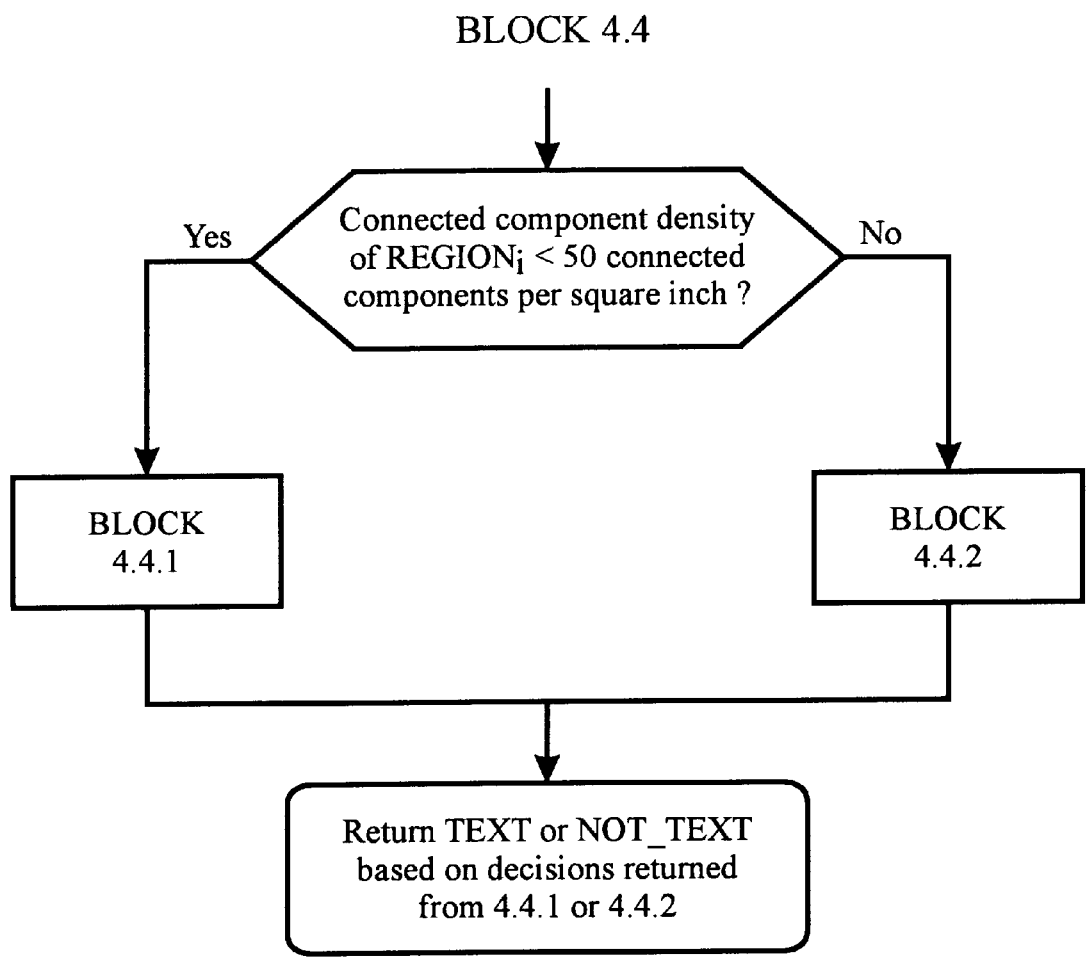

The flowchart in FIG. 19 depicts Block 4.4 at the highest level.

Block 4.4.1: Top Level

Figure 20A:
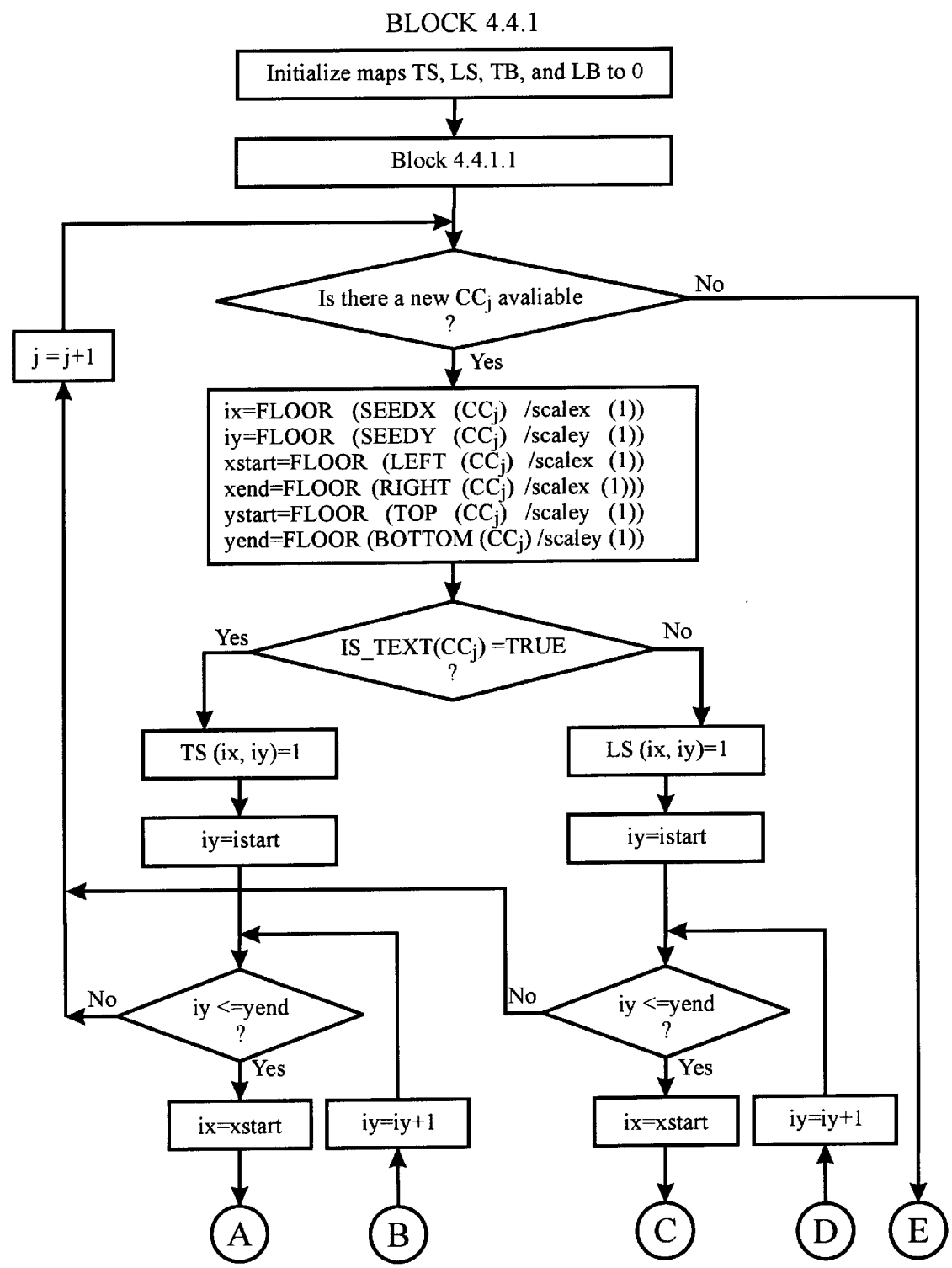
Figure 20B:
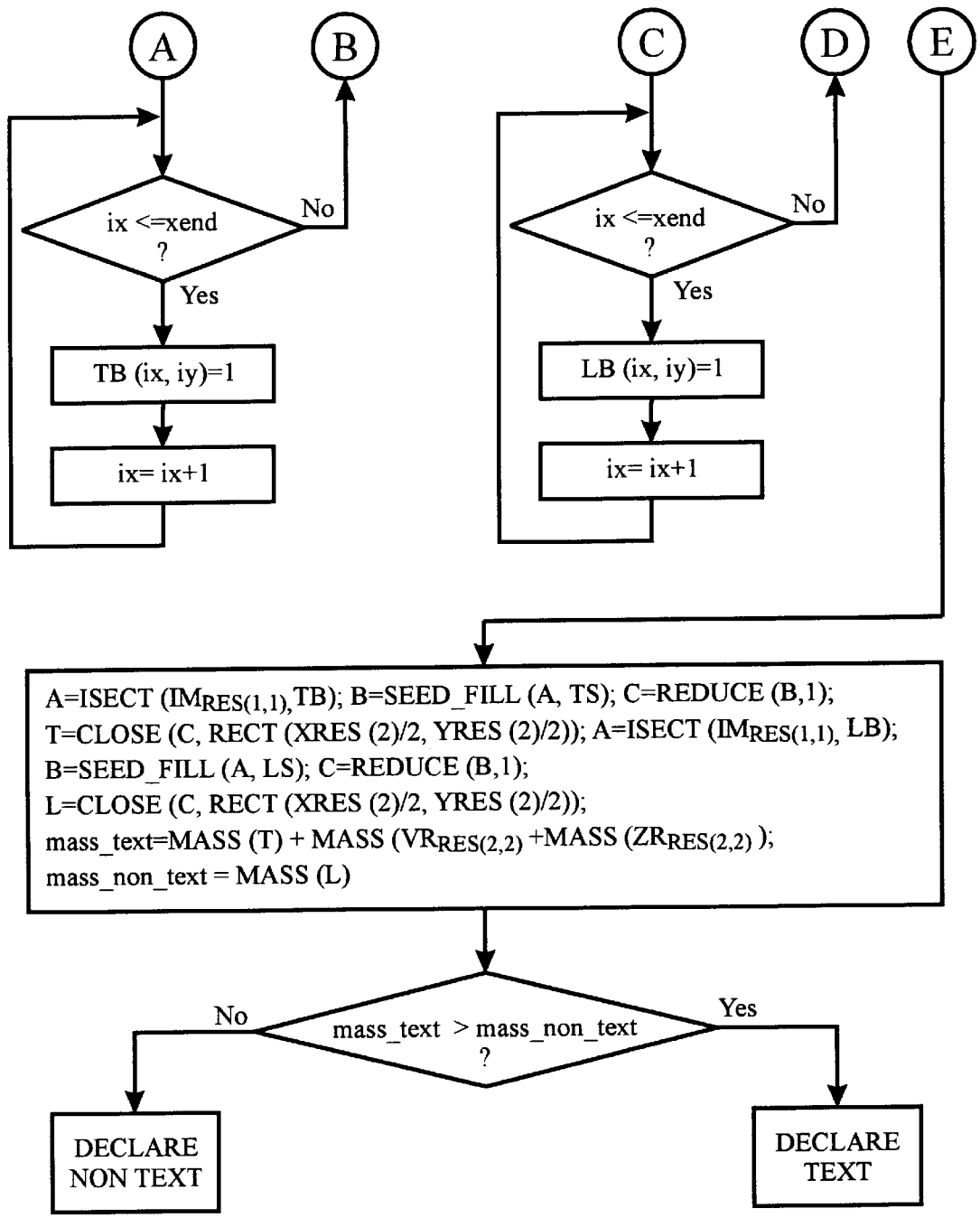
Figure 21A:
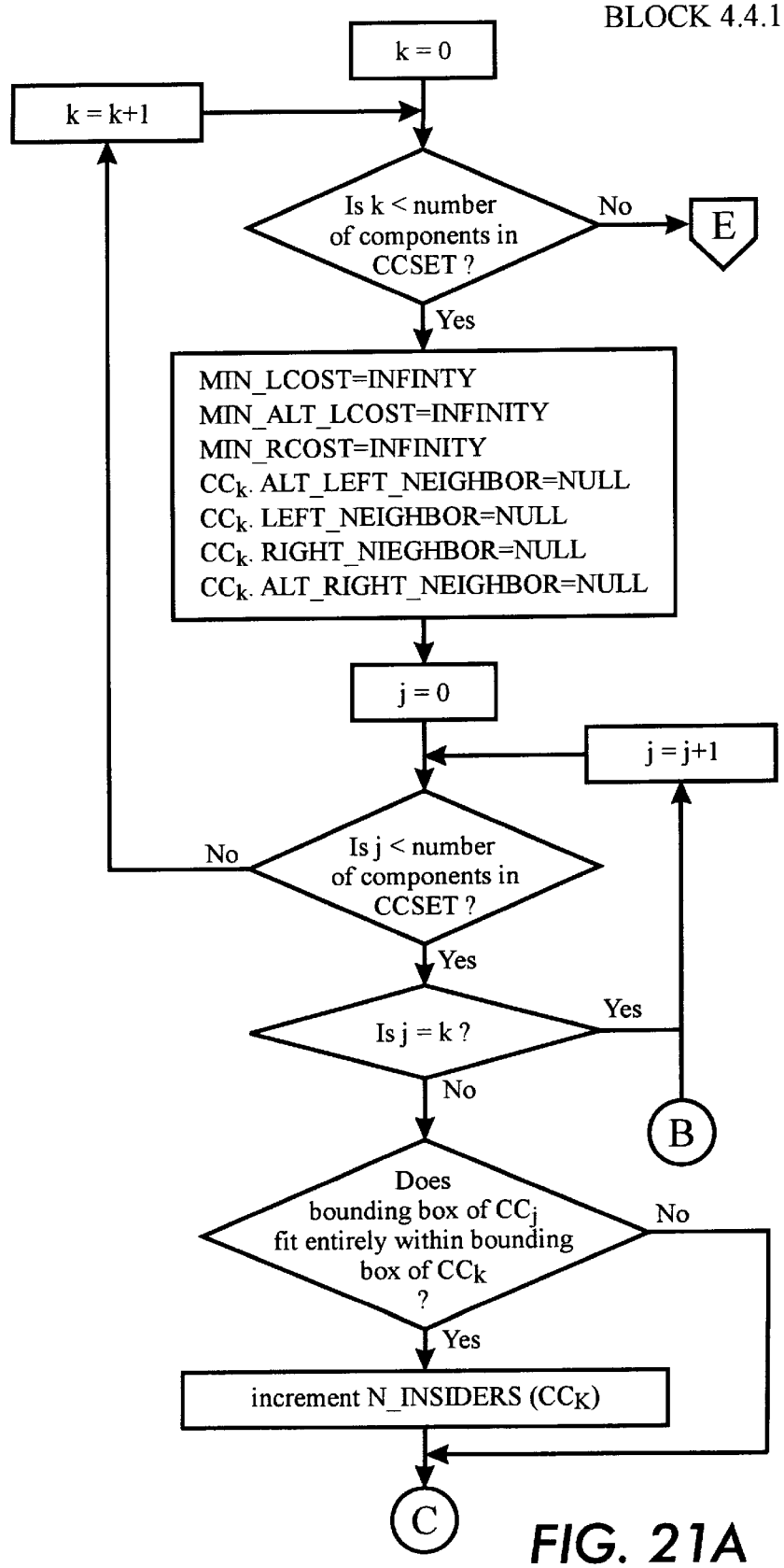
Figure 21B:
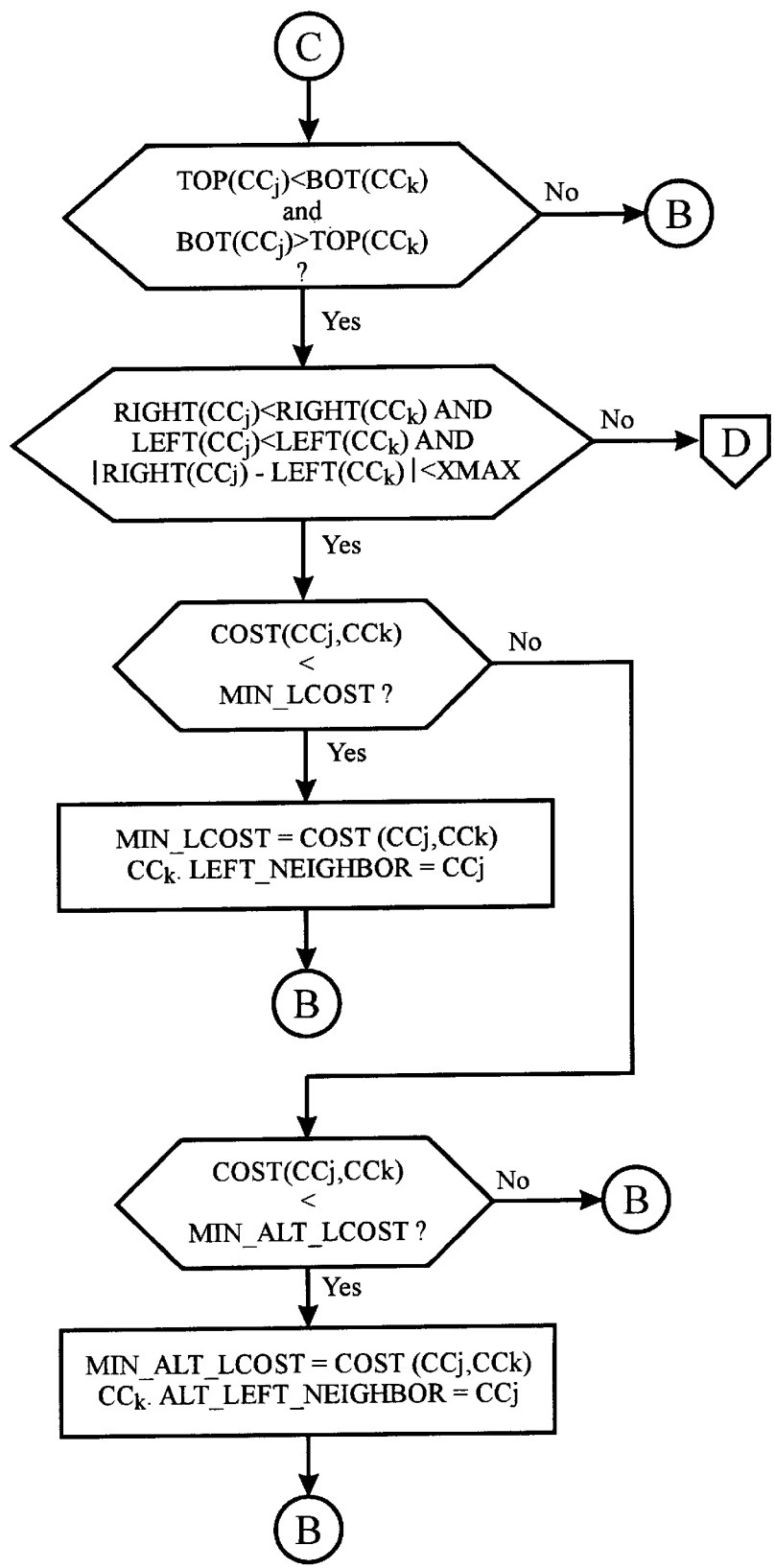
Figure 21C:
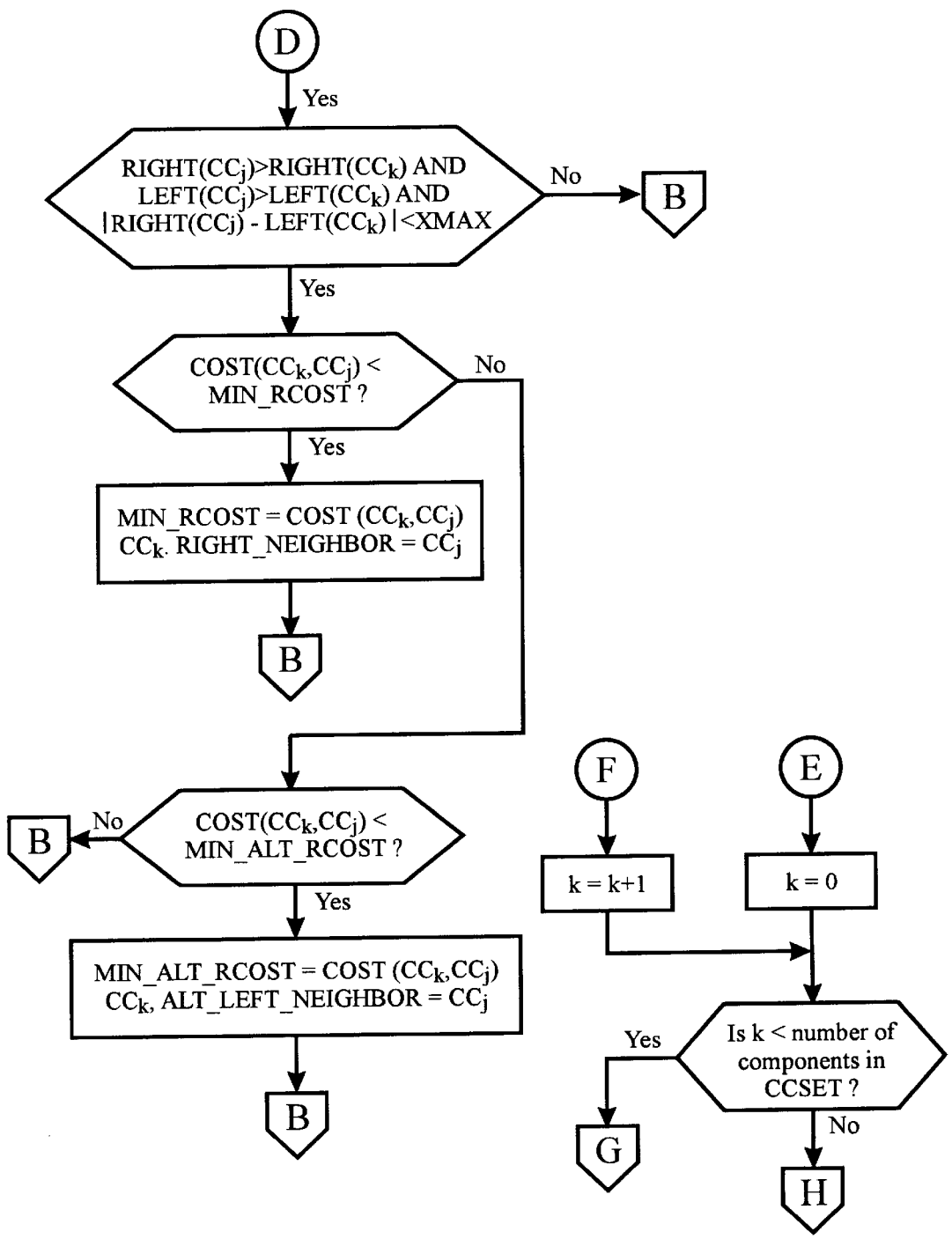
Figure 21D:
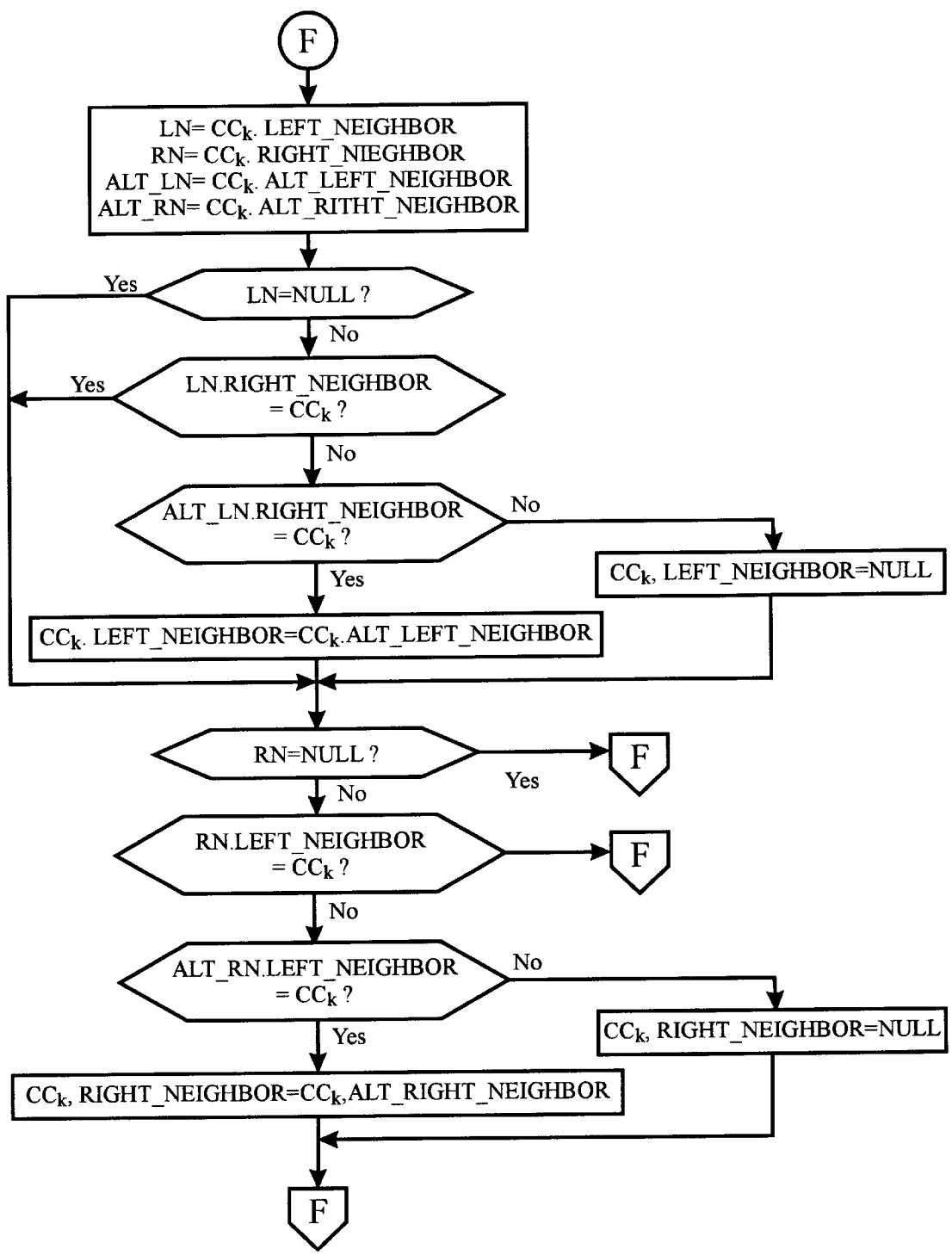
Figure 21E:
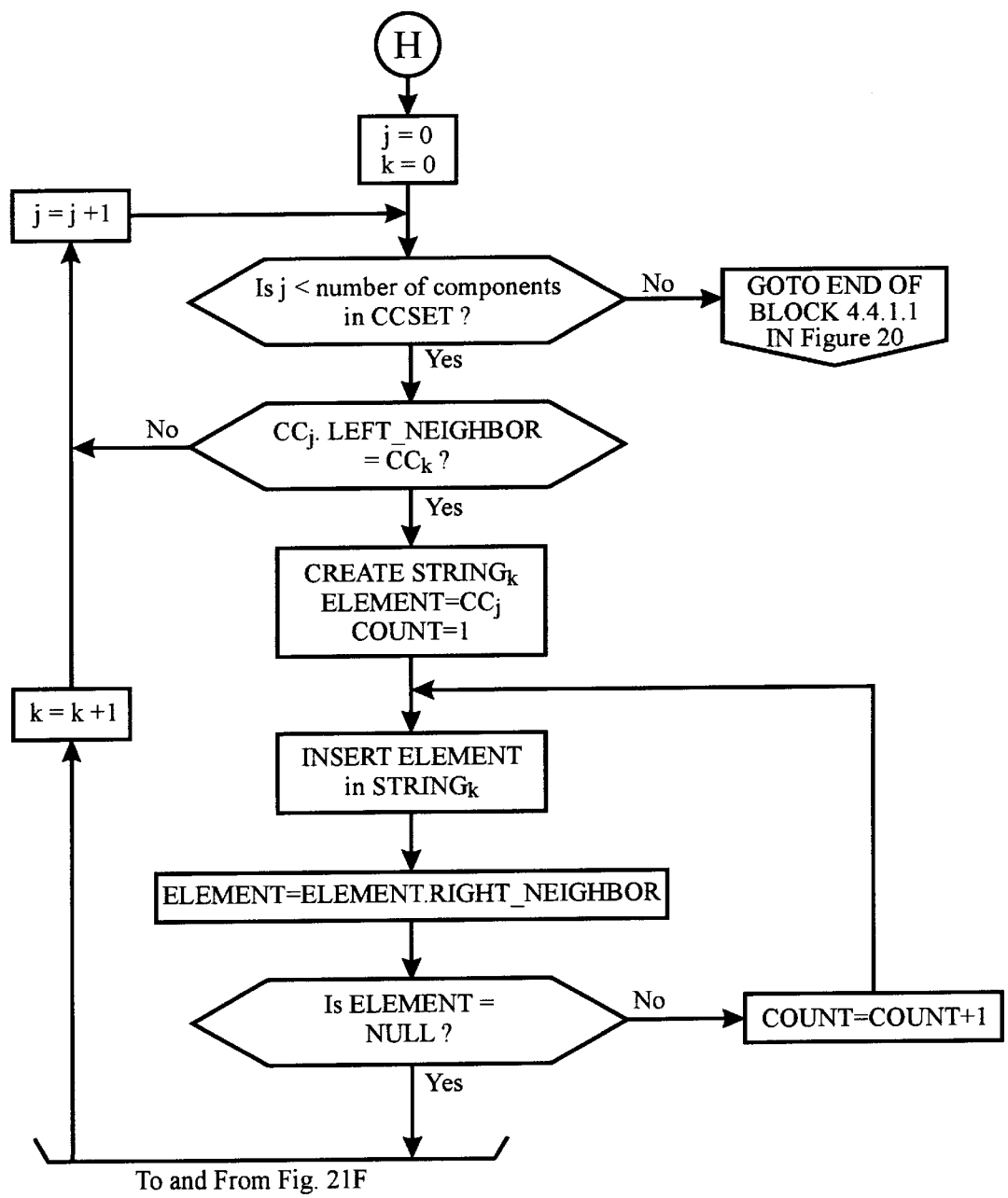
Figure 21F:
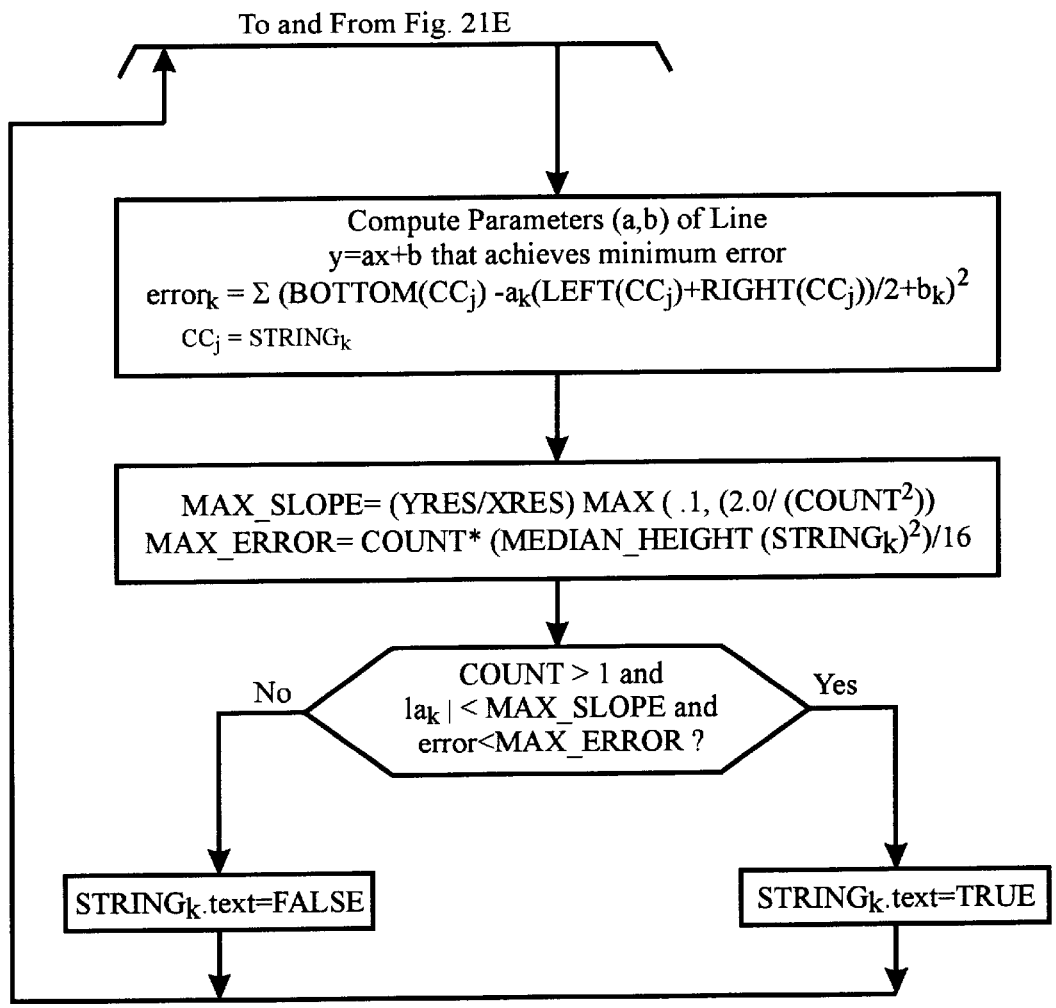

FIG. 20 depicts a top level flowchart of Block 4.4.1. The flowchart of FIGS. 21 expands sub block 4.4.1.1. The IS_TEXT() operator referred to in FIG. 20 is expanded in FIG. 23.

The RES(1,1) maps, TS, LS, TB, and LB, are first initialized to 0.

$IS\_TEXT(CC_j)$ is evaluated for each connected component $CC_j$ in $CCSET_i$.

If $IS\_TEXT(CC_j)$ is TRUE, the pixel in TS at (x,y) location (FLOOR(SEEDX($CC_j$)/scalex(1)),FLOOR(SEEDY($CC_j$)/scaley(1))) is set. This pixel is at the location in the low resolution map that corresponds to the location of a pixel from the full resolution map that is a member of the connected component $CC_j$. Also, a rectangular block of pixels in TB from the range FLOOR(LEFT($CC_j$)/scalex(1))<=x<=FLOOR(RIGHT($CC_j$)/scalex(1))

and

FLOOR(TOP($CC_j$)/scaley(1))<=y<=FLOOR(BOTTOM($CC_j$)/scaley(1))

is set.

Alternatively, if $IS\_TEXT(CC_j)$ is FALSE, the pixel in LS at (x,y) location (FLOOR(SEEDX($CC_j$)/scalex(1)), FLOOR(SEEDY($CC_j$)/scaley(1))) is set. Also, a rectangular block of pixel locations in LB from the range FLOOR(LEFT($CC_j$)/scalex(1))<=x<=FLOOR(RIGHT($CC_j$)/scalex(1))

and

FLOOR(TOP($CC_j$)/scaley(1))<=y<=FLOOR(BOTTOM($CC_j$)/scaley(1))

is set.

After all the components have been visited, the following operations are performed to generate a map that reflects the distribution of text components throughout the region:

A=ISECT($IM_{RES(1,1)}$,TB)

B=SEED_FILL(A,TS)

C=REDUCE(B,1)

T=CLOSE(C,RECT(XRES(2)/2,YRES(2)/2))

The seed fill operation selects all the components in $IM_{RES(1,1)}$ that intersect with connected components where $IS\_TEXT(CC_j)$ is TRUE. However components that are separated at full resolution may be joined at the lower RES(1,1) resolution, hence the intersection with TB is computed to prevent this merging from introducing any out-of-class pixels outside of a given component's bounding box. However, out-of-class pixels may appear within a connected component's bounding box. This is undesirable, but tolerable. The weight assigned to text components will be the mass (number of on-pixels) in T, given by MASS(T). The closing is designed to make this weighting reflect the overall distribution of the components, how tightly they are clustered and how widely they are spread.

Similarly, a map L reflecting the distribution of non text components is constructed as:

A=ISECT($IM_{RES(1,1)}$,LB)

B=SEED_FILL(A,LS)

C=REDUCE(B,1)

L=CLOSE(C,RECT(XRES(2)/2,YRES(2)/2))

The region is declared text if $$MASS(T)+MASS(VR_{RES(2,2)})+MASS(ZR_{RES(2,2)})>MASS(L)$$

otherwise the region is declared line drawing (non text).

$MASS(VR_{RES(2,2)})$ and $MASS(ZR_{RES(2,2)})$ are the number of on-pixels in the horizontal and vertical rulings maps, respectively, at resolution RES(2,2).

Block 4.4.1.1: Finding Spatial Arrangements of Components in a Given CCSET

FIG. 21 depicts the flowchart for block 4.4.1.1. This block generates data structures that capture certain aspects about the spatial arrangements of connected components in a given CCSET. For each connected component, $CC_k$, block 4.4.1.1 finds all other components with bounding boxes that occur totally within the bounding box of that component. The count of such components for $CC_k$ is denoted by $N\_INSIDERS(CC_k)$. Note, since small components have already been filtered out, noise should not contribute to this count, however, broken characters may have counts in excess of 1.

Block 4.4.1.1 also partitions the set of connected components in $CCSET_i$ into mutually exclusive subsets where each subset contains components that seem to be clustered together in some hypothetical line of text. It then makes a decision about whether that entire subset is text or not based on the alignment of all the components in that subset.

As a first step in finding these subsets, left and right neighbors are found for each component. For each connected component, $CC_k$, in $CCSET_i$, the invention performs a search to find a left neighbor, $CC_k$.LEFT_NEIGHBOR, an alternate left neighbor, $CC_k$.ALT_LEFT_NEIGHBOR, a right neighbor, $CC_k$.RIGHT_NEIGHBOR, and an alternate right neighbor, $CC_k$.ALT_RIGHT_NEIGHBOR.

$COST(CC_j,CC_k)$ is defined as:

$$COST(CC_j, CC_k) = (XRES) \times \left| \frac{TOP(CC_j) + BOT(CC_j) - TOP(CC_k) - BOT(CC_k)}{2} \right| + (YRES) \times MAX(0, (RIGHT(CC_j) - LEFT(CC_k)))$$

The left neighbors are found as follows:

$CC_k.\text{LEFT\_NEIGHBOR} = CC_j$ if $j \neq k$, $\text{RIGHT}(CC_j) < \text{RIGHT}(CC_k), \text{LEFT}(CC_j) < \text{LEFT}(CC_k.),$ $|\text{RIGHT}(CC_j) - \text{LEFT}(CC_k)| < \text{XMAX},$ $\text{TOP}(CC_j < \text{BOT}(CC_k), \text{BOT}(CC_j) > \text{TOP}(CC_k),$ and $\text{COST}(CC_j, CC_k) <= \text{COST}(CC_j, CC_k)$ for all $i$ such that $i \neq k$.

$\text{XMAX} = \text{XRES}$ is a reasonable choice.

There may no such $CC_j$ found that satisfies the conditions above, in this case $CC_k.\text{LEFT\_NEIGHBOR}$ and $CC_k.\text{ALT\_LEFT\_NEIGHBOR}$ are said to be empty and this is denoted by assigning the value NULL to both $CC_k.\text{LEFT\_NEIGHBOR}$ and $CC_k.\text{ALT\_LEFT\_NEIGHBOR}$.

IF $CC_k.\text{LEFT\_NEIGHBOR}$ is not EMPTY, $CC_k.\text{ALT\_LEFT\_NEIGHBOR}=CC_m$ if $m \neq k$, $m \neq j$, $\text{RIGHT}(CC_m)<\text{RIGHT}(CC_k)$, $\text{LEFT}(CC_m)<\text{LEFT}(CC_k.)$, $|\text{RIGHT}(CC_m)-\text{LEFT}(CC_k)|<\text{XMAX}$, $\text{TOP}(CC_m)<\text{BOT}(CC_k)$, $\text{BOT}(CC_m)>\text{TOP}(CC_k)$, and $\text{COST}(CC_m,CC_k)<=\text{COST}(CC_i,CC_k)$ for all i such that $i \neq k$, $i \neq j$, where j is the index of $CC_k.\text{LEFT\_NEIGHBOR}$. There may no such $CC_m$ that satisfies the conditions above, in this case $CC_k.\text{ALT\_LEFT\_NEIGHBOR}$ is assigned the value NULL.

The right neighbors are found as follows:
$CC_k.\text{RIGHT\_NEIGHBOR}=CC_j$ if $j \neq k$, $\text{RIGHT}(CC_j)>\text{RIGHT}(CC_k)$, $\text{LEFT}(CC_j)>\text{LEFT}(CC_k.)$, $|\text{RIGHT}(CC_j)-\text{LEFT}(CC_j)|<\text{XMAX}$, $\text{TOP}(CC_j)<\text{BOT}(CC_k)$, $\text{BOT}(CC_j)>\text{TOP}(CC_k)$, and $\text{COST}(CC_k,CC_j)<=\text{COST}(CC_k,CC_i)$ for all i such that $i \neq k$.

There may no such $CC_j$ that satisfies the conditions above, in this case $CC_k.\text{RIGHT\_NEIGHBOR}$ and $CC_k.\text{ALT\_RIGHT\_NEIGHBOR}$ are said to be empty and this is denoted by assigning the value NULL to both $CC_k.\text{RIGHT\_NEIGHBOR}$ and $CC_k.\text{ALT\_RIGHT\_NEIGHBOR}$.

IF $CC_k.\text{RIGHT\_NEIGHBOR}$ is not NULL, $CC_k.\text{ALT\_RIGHT\_NEIGHBOR}=CC_m$ if $m \neq k$, $m \neq j$, $\text{RIGHT}(CC_m)>\text{RIGHT}(CC_k)$, $\text{LEFT}(CC_m)>\text{LEFT}(CC_k.)$, $|\text{RIGHT}(CC_k)-\text{LEFT}(CC_m)|<\text{XMAX}$, $\text{TOP}(CC_m)<\text{BOT}(CC_k)$, $\text{BOT}(CC_m)>\text{TOP}(CC_k)$, and $\text{COST}(CC_k,CC_m)<=\text{COST}(CC_k,CC_i)$ for all i such that $i \neq k$, $i \neq j$, where j is the index of $CC_k.\text{RIGHT\_NEIGHBOR}$. There may no such $CC_m$ that satisfies the conditions above, in this case $CC_k.\text{ALT\_RIGHT\_NEIGHBOR}$ is assigned the value NULL.

The purpose of finding left and right neighbors is to decompose CCSET into a union of mutually exclusive subsets. A subset is found by selecting the next connected component in CCSET that has a NULL left neighbor. This component is the head of a list of components linked by right neighbors and terminated with a component that has an empty right neighbor. The subset corresponds to all the components in this linked list. This disclosure refers to each of these subsets, indexed by k, as $\text{STRING}_k$.

Before proceeding to find these subsets, neighbors have to be resolved such that the subsets generated are mutually exclusive. If the following conditions are met for all j, the subsets are guaranteed to be mutually exclusive:

$(CC_j.\text{LEFT\_NEIGHBOR}).\text{RIGHT\_NEIGHBOR}=CC_j$
or
$CC_j.\text{LEFT\_NEIGHBOR}=\text{NULL}$
$(CC_j.\text{RIGHT\_NEIGHBOR}).\text{LEFT\_NEIGHBOR}=CC_j$
or
$CC_j.\text{RIGHT\_NEIGHBOR}=\text{NULL}$ These two conditions can be satisfied by visiting all the components in CCSET and reassigning the links as follows:

Whenever condition 1 is not satisfied, the left neighbor of $CC_j$ is replaced by the alternate left neighbor of $CC_j$ if doing such satisfies 1, otherwise the left neighbor of $CC_j$ is set to NULL.

Whenever condition 2 is not satisfied, the right neighbor of $CC_j$ is replaced by the alternate right neighbor of $CC_j$ if doing such satisfies 2, otherwise the right neighbor of $CC_j$ is set to NULL.

Figure 22A:
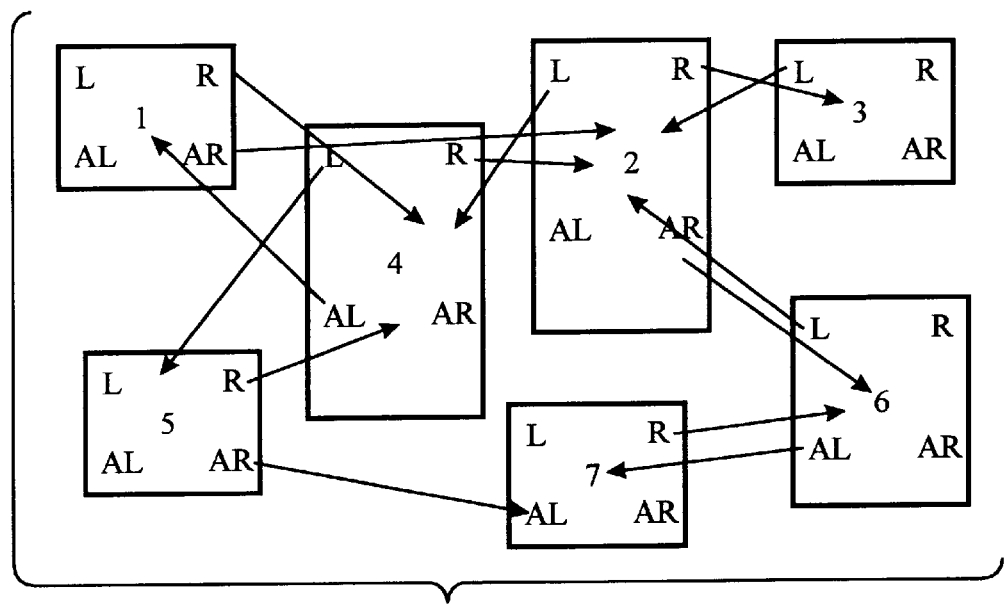
FIGS. 22A–22C are graphic illustrations of finding relationships of image data according to a specific method of a preferred embodiment of the present invention.
Figure 22B:
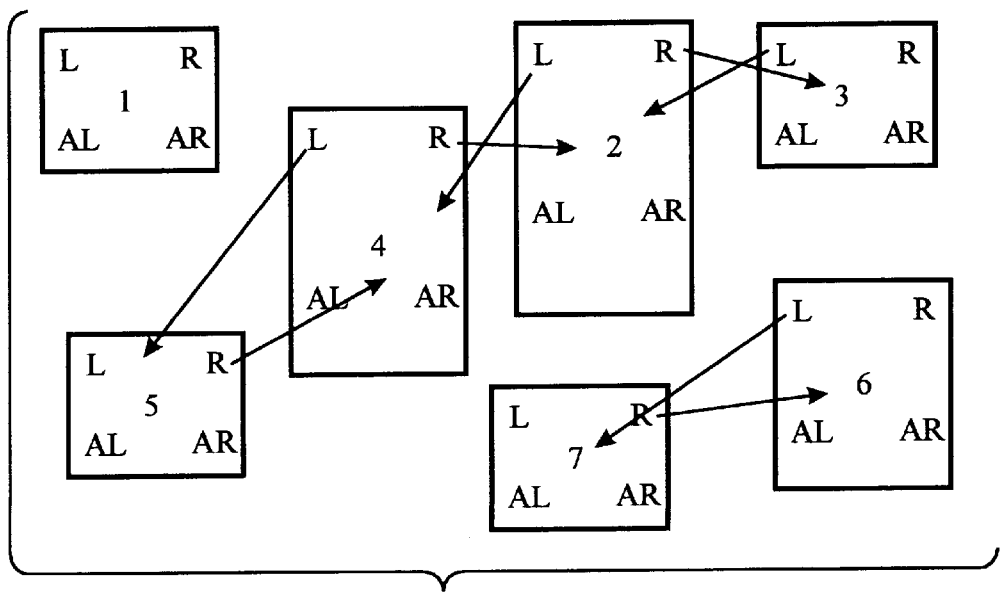
Figure 22C:
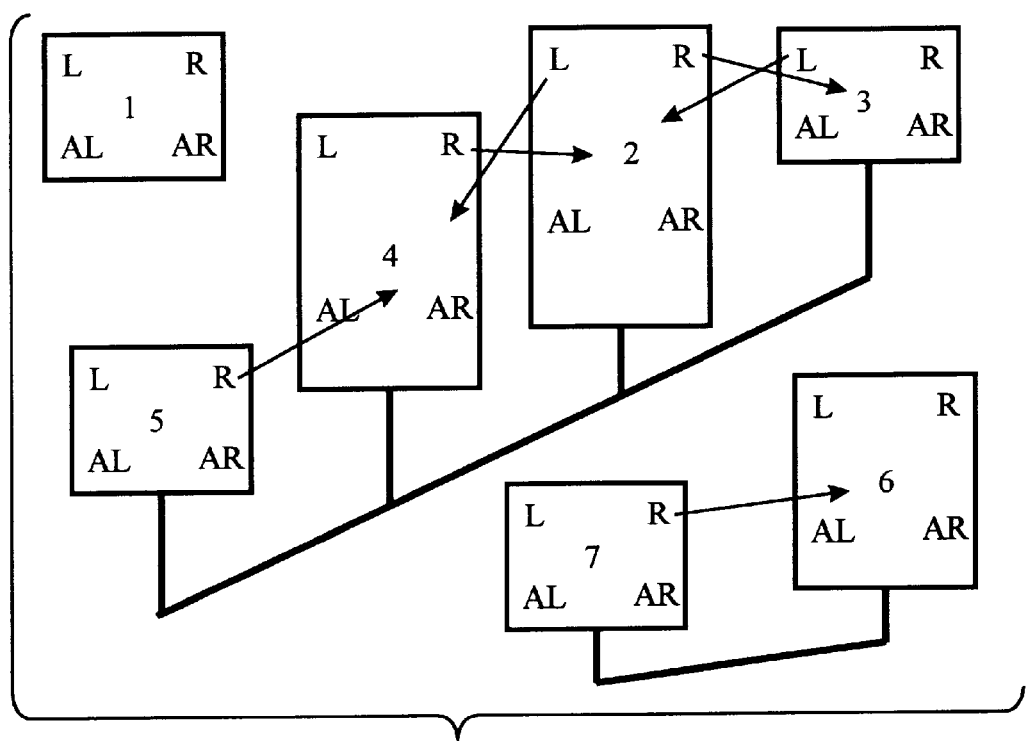

FIG. 22A depicts an arbitrary arrangement of connected component (CC) bounding boxes and the left and right neighbor pairings. The arrow emanating from the R, AR, L, and AL label inside of a rectangle points, respectively, to the right neighbor, alternate right neighbor, left neighbor, and alternate left neighbor for that CC. The absence of an arrow indicates a NULL value. FIG. 22B depicts the resolution of the links. FIG. 22C depicts the linked lists of rectangles, each list forming a subset.

For each $\text{STRING}_k$, the invention fits a line, characterized by the equation y=ax+b, through the midpoint of the bottom edges of the bounding box of each component in the subset using a least squares linear fit. An example of this is depicted in FIG. 22C.

The parameters of the line, (a,b) are chosen so that the sum of the square differences between $y_i$ and $ax_i+b$ are minimized over all members $CC_i$ of a given $\text{STRING}_k$ where $x_i=(\text{LEFT}(CC_i)+\text{RIGHT}(CC_i))/2$ and $y_i=\text{BOTTOM}(CC_i)$. This disclosure does not expand on the least squares formulation for the selection of a and b, since it is well known.

The error is given as:

$$\text{error}_k = \sum_{CC_i \in STRING_k} (\text{BOTTOM}(CC_j) - a_k(\text{LEFT}(CC_i) + \text{RIGHT}(CC_i))/2 + b_k)^2$$

For each subset of components, the invention makes a decision as to whether a given string is text or not text based on the slope of the line fit to that subset, and the error associated with the fit.

$\text{STRING}_k.\text{text}=\text{TRUE}$ if $\text{COUNT}(\text{STRING}_k)>1$ and $|a_k|<(\text{YRES/XRES})\text{MAX}(0.1,(2.0/(\text{COUNT}(\text{STRING}_k)2))$ and $\text{error}_k<\text{COUNT}(\text{STRING}_k)(\text{MEDIAN\_HEIGHT}(\text{STRING}_k)2)/16$ Otherwise $\text{STRING}_k.\text{text}=\text{FALSE}$.

Where $\text{MEDIAN\_HEIGHT}(\text{STRING}_k)$ is the median of the component heights in $\text{STRING}_K$ and $\text{COUNT}(\text{STRING}_k)$ denotes the number of components in a given string.

Block 4.4.1: The IS_TEXT( ) Operator

The IS_TEXT( ) operator returns a decision about whether or not a given component is text.

$CC_j.\text{STRING}$ denotes the string assigned to $CC_j$ by block 4.4.1.1.

$\text{IS\_TEXT}(CC_j)$ returns TRUE if:

$CC_j.\text{STRING.text}$ is TRUE and $(\text{NRUNS}(CC_j)/\text{HEIGHT}(CC_j))<6$ and $\text{N\_INSIDERS}(CC_j)<3$ and $\text{HEIGHT}(CC_j)<3\text{MEDIAN\_HEIGHT}(\text{STRING}_k)$ HEIGHT(CC$_j$)<H4

If any of these criteria is not satisfied, IS_TEXT(CC$_j$) returns FALSE.

Figure 23:
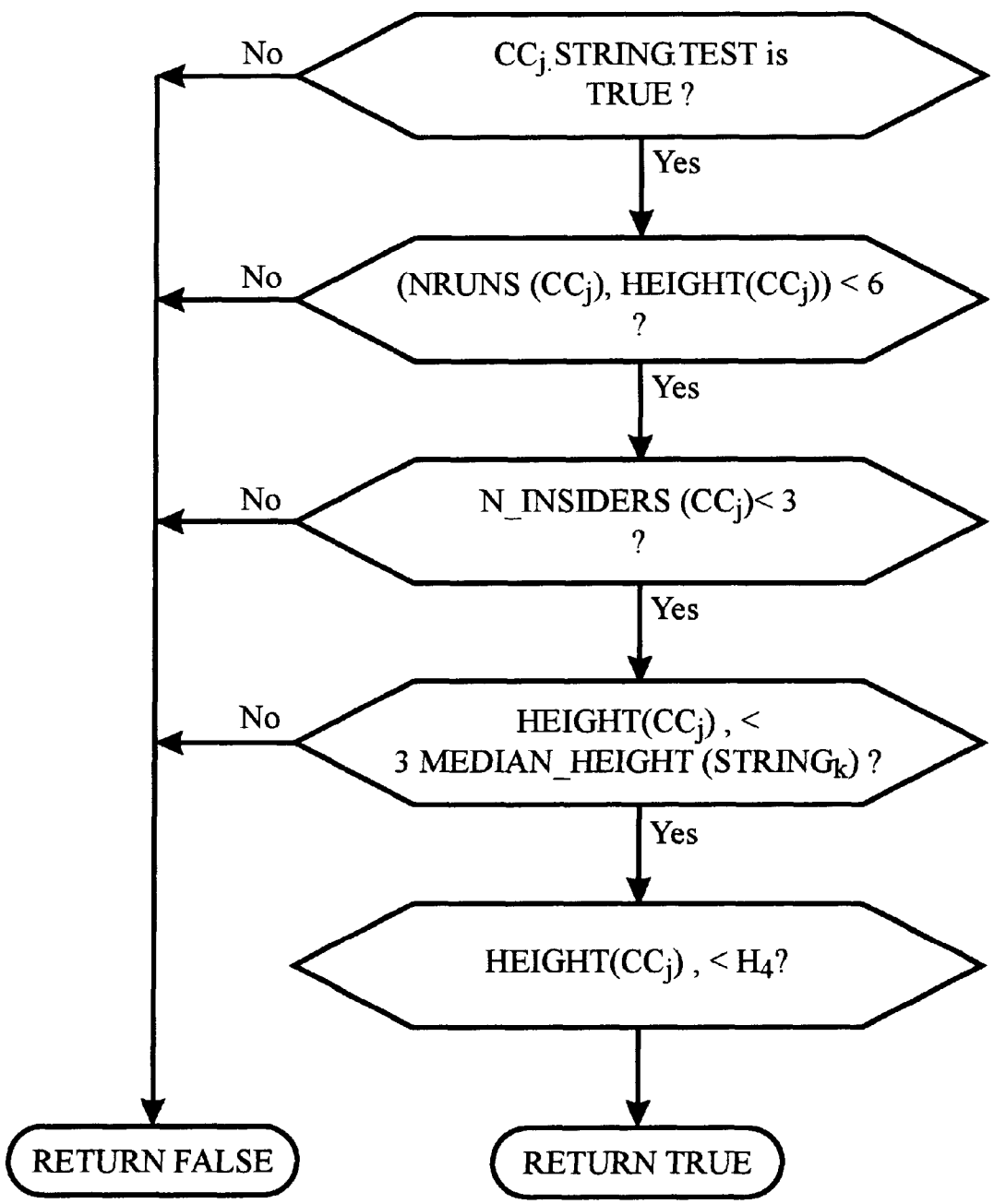
FIG. 23 is a flowchart showing a specific function of a preferred embodiment of the present invention.

It is not critical that the decision about a given component is correct, since the final decision will be based on all of the components in a given CCSET$_i$ corresponding to a given region REGION$_i$. FIG. 23 depicts the flowchart for the IS_TEXT( ) operator.

Block 4.4.1 is computationally expensive for high connected component counts because it performs a computation with complexity proportional to the square of the number of connected components in a given CCSET. It is possible to reduce the complexity by searching for left and right neighbors within a limited radius of a given component. Even so, block 4.4.1 is primarily intended to test regions with connected component densities less than fifty connected components per square inch. When the average connected component density of a region is greater than 50 connected components per square inch, block 4.4 uses block 4.4.2 instead to determine whether or not a given region is text or line drawing.

Block 4.4.2

Block 4.4.2 is based on computing the projection histogram of connected component rectangles in CCSET within vertical columns of the image, then computing the sum of the squares of the first difference of those histograms, then dividing that result by twice the number of components in CCSET. This is an indication of how well the top and bottoms of the components line up. If this value exceeds 3, Block 4.4.2 declares text.

Histogram(icol,irow) is a count of the number of connected components in CCSET that satisfy TOP(CC)<=irow× ROW_HEIGHT, BOTTOM(CC)>=irow×ROW_HEIGHT, LEFT(CC)>=icol×COLUMN_WIDTH, and LEFT(CC)< (icol+1)×COLUMN_WIDTH.

COLUMN_WIDTH=20×(MEDIAN_WIDTH (CCSET)).

Where MEDIAN_WIDTH(CCSET) refers to the median width of the connected components bounding boxes in CCSET.

ROW_HEIGHT=MEDIAN_HEIGHT(CCSET)/8.

Where MEDIAN_HEIGHT(CCSET) refers to the median height of the connected components bounding boxes in CCSET.

Let MAX_X(CCSET) be the largest value LEFT(CC) in CCSET. Let MAX_Y(CCSET) be the largest value of BOTTOM(CC) in CCSET.

For each icol, 0<=icol<=FLOOR((MAX_X+ COLUMN_WIDTH-1)/COLUMN_WIDTH), for each irow, -1<=irow<=MAX_Y(CCSET), SUMSRQ is the sum of all the terms $$(\text{Histogram}(icol,irow)-\text{Histogram}(icol,irow+1))^2$$

This sum can be expressed as:

$$\sum_{icol=0}^{MAX\_ICOL} \sum_{irow=-1}^{MAX\_Y(CCSET)} (\text{Histogram}(icol, irow) - \text{Histogram}(icol, irow+1))^2$$

Where MAX_ICOL=FLOOR((MAX_X+COLUMN_ WIDTH-1)/COLUMN_WIDTH).

If SUMSQR/(2×COUNT(CCSET))>3, declare text, otherwise declare non text.

What is claimed is:

1. A method of analyzing data forming a two-dimensional image, comprising the step of:

identifying a subset of black pixels in the data as likely to belong to a line drawing region if there is not a predetermined arrangement of horizontal runs of white pixels above and below the subset of black pixels, the identifying step including the step of for a subset of the data characterized by a first run of white pixels overlapping a second run of white pixels by a minimum length W, the first run of white pixels being spaced from the second run of white pixels by a vertical separation H, identifying the subset of data as likely to belong to a line drawing region if W/H is not within a predetermined range.

2. A method of analyzing data forming a two-dimensional image comprising the steps of:

identifying a subset of black pixels in the data as likely to belong to a line drawing region if there is not a predetermined arrangement of horizontal runs of white pixels above and below the subset of black pixels; the identifying step including the step of, for a subset of the data characterized by a first run of white pixels overlapping a second run of white pixels by a minimum length W, the first run of white pixels being spaced from the second run of white pixels by a vertical separation H, identifying the subset of data as likely to belong to a line drawing region if W/H is not within a predetermined range; and identifying the subset of data as likely to be a line drawing region if, for at least a pair of runs of white pixels overlapping by a length W1 or W2, separated respectively by vertical separation H1 or H2, neither W1/H1 or W2/H2 is within a predetermined range.

3. The method of claim 2, further comprising the step of deriving low-resolution data from the data, the low-resolution data being consistent with a low-resolution version of the two-dimensional image; and wherein said identifying step is performed on the low-resolution data.

4. A method of analyzing data forming a two-dimensional image, comprising the steps of:

identifying a subset of black pixels in the data as likely to belong to a line drawing region if there is not a predetermined arrangement of horizontal runs of white pixels above and below the subset of black pixels, the identifying step including the step of deriving low-resolution data from the data, the low-resolution data being consistent with a low-resolution version of the two-dimensional image, wherein said identifying step is performed on the low-resolution data;

for a subset of the data characterized by a first run of white pixels overlapping a second run of white pixels by a minimum length W, the first run of white pixels being spaced from the second run of white pixels by a vertical separation H, identifying the subset of data as likely to be a line drawing region if W/H is not within a predetermined range; and the step of deriving low-resolution data including the steps of rendering the data a low resolution map;

performing on the low resolution map a closing with a vertical structuring element of height H; and performing on the resulting low resolution map a dilation with a horizontal structuring element of a width of not more than W.

5. The method of claim 4, the step of deriving low-resolution data further including the steps of
eroding a horizontal run of white pixels from the data; and
rendering the eroded horizontal run of white pixels on a low resolution map.

6. The method of claim 4, the step of using a horizontal structuring element having a width of one pixel less than W.

7. The method of claim 2, further comprising the step of
identifying as likely to belong to line drawing components, a set of black pixels which are connected to data in the image which is identified as likely to belong to a line drawing region.

8. The method of claim 7, further comprising the steps of
subtracting the set of data likely to belong to line drawing components from the data; and
identifying a remainder of data, following said subtracting step, as likely to belong to text regions.

9. The method of claim 7, comprising the step of
deriving low-resolution data from the data, the low-resolution data being consistent with a low-resolution version of the two-dimensional image, and performing said step of subtracting the set of data likely to belong to line drawing components on the low-resolution data.

10. The method of claim 7, further comprising the step of
identifying as likely to be body text, from the data not identified as likely to belong to a line drawing region, clusters of a predetermined size.

11. A method of analyzing data forming a two-dimensional image, comprising the steps of:
identifying a subset of black pixels in the data as likely to belong to a line drawing region if there is not a predetermined arrangement of horizontal runs of white pixels above and below the subset of black pixels;
identifying as likely to be body text, from the data not identified as likely to belong to a line drawing region, clusters of a predetermined size;
identifying as likely to belong to line drawing components, a set of black pixels which are connected to data in the image which is identified as likely to belong to a line drawing region; and
performing a closing on the clusters.

12. The method of claim 11, further comprising the step of
subtracting data identified as likely to be body text from any data in the image not previously identified as a text region, thereby yielding as a remainder a refined set of line art components.

13. The method of claim 11, further comprising the step of
identifying as likely to be stray text, from the data identified as likely to be text components, data which is not included in clusters of data of a predetermined size.

14. A method of analyzing full-resolution data forming a two-dimensional image, comprising the steps of:
deriving low-resolution data from the full-resolution data, the low-resolution data being consistent with a low-resolution version of the two-dimensional image;
for a subset of the low-resolution data characterized by a first run of white pixels overlapping a second run of white pixels a minimum length W, the first run of white pixels being spaced from the second run of white pixels by a vertical spacing H, identifying the subset of data as likely to belong to a line drawing region if W/H is not within a predetermined range;
identifying as likely to belong to line art components within the low-resolution data, a set of black pixels which are connected to data in the image which is identified as likely to belong to a line drawing region.

15. The method of claim 14, further comprising the step of
identifying as likely to be body text, from the low-resolution data not identified as likely to belong to a line drawing region, clusters of data of a predetermined size.

16. The method of claim 14, further comprising the step of detecting data which is not included in clusters of data of a predetermined size from the low-resolution data not identified as likely to belong to a line drawing region, and identifying such detected data as likely to be stray text.

17. The method of claim 15, further comprising the step of
subtracting data identified as likely to be body text from any data in the image not previously identified as a text region, thereby yielding as a remainder a refined set of line art components.

18. The method of claim 17, further comprising the steps of
identifying as stray text, from the low-resolution data not identified as likely to belong to a line drawing region, connected components which are not included in clusters of data of a predetermined size;
adding a connected component of the stray text to the refined set of line art components if the connected component of the stray text is connected to any of the refined set of line art components.

* * * * *